(12) United States Patent
Tompkin et al.

(10) Patent No.: US 10,427,368 B2
(45) Date of Patent: Oct. 1, 2019

(54) MULTI-LAYER BODY

(71) Applicant: OVD Kinegram AG, Zug (CH)

(72) Inventors: Wayne Robert Tompkin, Baden (CH); Harald Walter, Horgen (CH)

(73) Assignee: OVD Kinegram AG, Zug (CH)

( * ) Notice: Subject to any disclaimer, the term of this patent is extended or adjusted under 35 U.S.C. 154(b) by 258 days.

(21) Appl. No.: 15/592,918

(22) Filed: May 11, 2017

(65) Prior Publication Data
US 2017/0239898 A1    Aug. 24, 2017

Related U.S. Application Data

(62) Division of application No. 14/005,112, filed as application No. PCT/EP2012/053873 on Mar. 7, 2012, now Pat. No. 9,676,156.

(30) Foreign Application Priority Data

Mar. 15, 2011  (DE) ........................ 10 2011 014 114

(51) Int. Cl.
*B29D 11/00*  (2006.01)
*B32B 15/04*  (2006.01)
(Continued)

(52) U.S. Cl.
CPC ............ *B29D 11/0074* (2013.01); *B32B 3/30* (2013.01); *B32B 15/04* (2013.01); *B42D 25/29* (2014.10);
(Continued)

(58) Field of Classification Search
CPC ....... B29D 11/0074; B32B 15/04; B32B 3/30; B32B 2551/00; B32B 2307/40;
(Continued)

(56) References Cited

U.S. PATENT DOCUMENTS

| | | | |
|---|---|---|---|
| 4,484,797 A | 11/1984 | Knop et al. | |
| 4,568,141 A | 2/1986 | Antes | |

(Continued)

FOREIGN PATENT DOCUMENTS

| | | |
|---|---|---|
| AU | 738289 | 6/1999 |
| AU | 2003283372 | 6/2004 |

(Continued)

OTHER PUBLICATIONS

Gregory et al., "Random facet Fresnel lenses and mirrors", Optical Engineering 40(5) (May 2001) 713-719.

(Continued)

*Primary Examiner* — Nathan L Van Sell
(74) *Attorney, Agent, or Firm* — Hoffmann & Baron, LLP

(57) ABSTRACT

The invention relates to a multi-layer body (10) and a process for the production thereof. The multi-layer body has a first layer (23) with a first surface (231) and a second surface (232) opposite the first surface (231). The first surface (231) of the first layer (23) is defined by a base plane spanned by coordinate axes x and y, wherein a large number of facet faces (50) are molded into the second surface (232) of the first layer (23) in a first area (31). Each of the facet faces (50) is determined by one or more of the parameters F, S, H, P, Ax, Ay and Az, wherein the parameters of the facet faces (50) arranged in the first area (31) are varied pseudo-randomly in the first area (31) within a variation range predefined in each case for the first area of surface and wherein a reflective second layer (24) is applied to each of the facet faces.

35 Claims, 19 Drawing Sheets

(51) Int. Cl.
  *B32B 3/30* (2006.01)
  *B42D 25/29* (2014.01)
  *B42D 25/324* (2014.01)
  *B42D 25/45* (2014.01)

(52) U.S. Cl.
  CPC .......... *B42D 25/324* (2014.10); *B42D 25/45* (2014.10); *B32B 2307/40* (2013.01); *B32B 2551/00* (2013.01); *B42D 2033/18* (2013.01); *B42D 2035/20* (2013.01); *Y10T 428/24355* (2015.01)

(58) Field of Classification Search
  CPC ...... B42D 25/45; B42D 25/324; B42D 25/29; B42D 2035/20; B42D 2033/18; Y10T 428/24355
  See application file for complete search history.

(56) References Cited

U.S. PATENT DOCUMENTS

| | | | |
|---|---|---|---|
| 5,032,003 | A | 7/1991 | Antes |
| 5,101,184 | A | 3/1992 | Antes |
| 5,105,306 | A | 4/1992 | Ohala |
| 5,301,062 | A | 4/1994 | Takahashi et al. |
| 6,157,487 | A | 12/2000 | Staub et al. |
| 7,102,823 | B2 | 9/2006 | Schilling et al. |
| 7,215,450 | B2 | 5/2007 | Schilling et al. |
| 7,517,578 | B2 | 4/2009 | Raksha et al. |
| 7,551,335 | B2 | 6/2009 | Schilling et al. |
| 2006/0056065 | A1 | 3/2006 | Schilling et al. |
| 2007/0183045 | A1 | 8/2007 | Schilling et al. |
| 2008/0258456 | A1 | 10/2008 | Rahm |
| 2009/0091834 | A1 | 4/2009 | Ryzi et al. |
| 2010/0084851 | A1 | 4/2010 | Schilling |
| 2010/0254007 | A1 | 10/2010 | Toda |

FOREIGN PATENT DOCUMENTS

| | | |
|---|---|---|
| DE | 102005061749 | 7/2007 |
| EP | 0105099 | 1/1986 |
| EP | 0375833 | 2/1993 |
| EP | 1855127 | 11/2007 |
| EP | 1562758 | 7/2011 |
| JP | 2008107472 | 5/2008 |
| JP | 2010517820 | 5/2010 |
| WO | WO199719821 | 6/1997 |
| WO | WO2002091041 | 11/2002 |
| WO | WO03059643 | 7/2003 |
| WO | WO03095657 | 11/2003 |
| WO | WO2006013215 | 2/2006 |
| WO | WO2006125224 | 11/2006 |
| WO | WO2010034420 | 4/2010 |
| WO | WO2011066991 | 6/2011 |

OTHER PUBLICATIONS

Kotacka et al., "Synthetic holography at 500.000 dpi: From renaissance of portraits to holographic dust", Renaissance International 2008.

Lee, "Micro mirror array nanostructures for anti-counterfeiting applications", SPIE vol. 5310 c. 2004.

Lee, "Colourtone lithography", Microelectronic Engineering 61-62 (2002) 105-111.

Leech et al., "Hot embossing of grating-based optically variable images in thermoplastic acrylic lacquer", Springer Science+ Business Media, LLC 2007.

Leech et al., "Optically variable micro-mirror arrays fabricated by graytone lithography", Microelectronic Engineering 83 (2006) 341-356.

Leech et al., "Printing via hot embossing of optically variable images in thermoplastic acrylic lacquer", Microelectronic Engineering 83 (2006) 1961-1965.

Leech et al., "Hot embossing of diffractive optically variable images in biaxially-oriented polypropylene", Microelectronic Engineering 84 (2007) 25-30.

Van Renesse, "Optical Document Security", Third Edition (2005) 196-210.

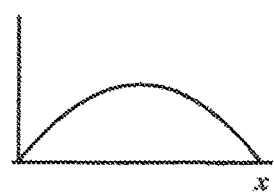 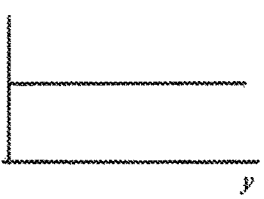 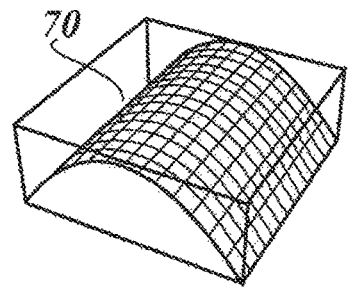
*Fig. 8a*
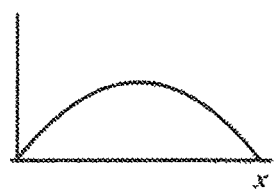 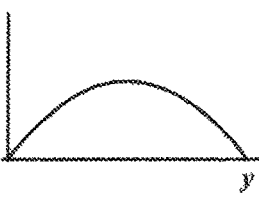 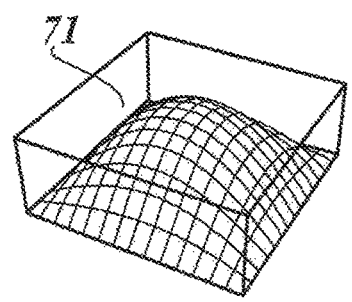
*Fig. 8b*
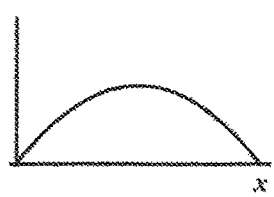 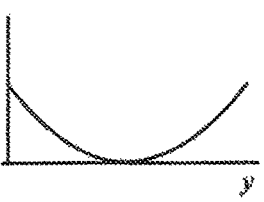 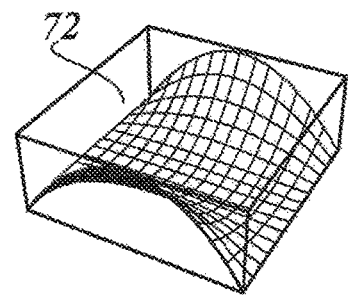
*Fig. 8c*
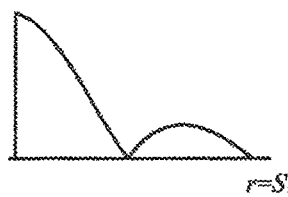 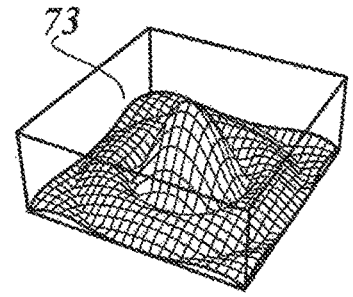
$r = Sqrt[x\wedge 2 + y\wedge 2]$
*Fig. 8d*

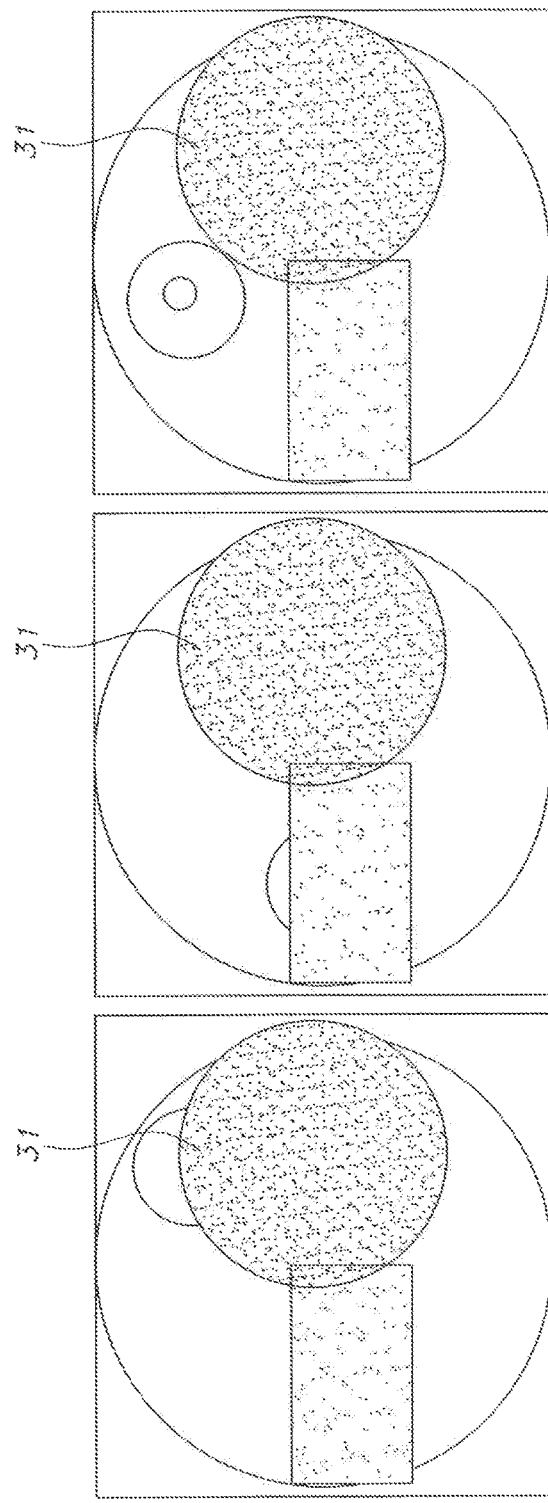

US 10,427,368 B2

MULTI-LAYER BODY

This application is a divisional application of U.S. application Ser. No. 14/005,112, filed Oct. 11, 2013, which claims priority based on an International Application filed under the Patent Cooperation Treaty, PCT/EP2012/053873, filed on Mar. 7, 2012, and German Application No. DE 102011014114.6-45, filed on Mar. 15, 2011.

BACKGROUND OF THE INVENTION

The invention relates to a multi-layer body, in particular in the form of a transfer film, a laminating film, a packaging film, a decoration element or security element, as well as a process for producing such a multi-layer body.

Security documents with a diffractive security element are known for example from EP 0 105 099 B1 and EP 0 375 833 B1. In these security elements, diffraction gratings are moulded into a layer of a multi-layer body and overlaid with a metallic reflective layer. The diffraction of the incident light at these diffraction gratings generates an optically variable effect which is determined by the spatial frequency of the diffraction gratings as well as their azimuthal angle. Thus, in the security element described in EP 0 105 099 B1 the diffraction structure is formed such that the colour pattern arising with a given illumination and viewing direction moves at a locally predetermined speed in a predetermined path when the substrate is rotated in its plane in a given direction of rotation and at a given speed. In EP 0 375 833 B1, the various fields of a grid field with a maximum dimension of less than 0.3 mm are overlaid with different diffraction gratings, with the result that when the security element is viewed different representations occur in different viewing directions of the security element.

A further possibility for producing an optically variable effect is described in WO 03/095657 A2. An achromatic surface structure here is combined with a thin-film structure in overlapping manner. The achromatic structures here have an order of magnitude in which diffraction phenomena influence the optical properties only slightly and thus the structures act essentially like tilted mirrors. The described security element here has partial surfaces which are overlaid with different achromatic surface structures, for example sawtooth structures which, in a first partial surface, have an azimuthal angle different from that of a second partial surface. These different partial surfaces are furthermore additionally overlaid with a thin-film layer structure, with the result that different colour and contrast changes are generated in the partial surfaces and the impression of a defined, almost discrete colour change forms for the observer during rotation or tilting.

SUMMARY OF THE INVENTION

The object of the invention now is to provide a film body as well as a process for the production thereof, which is characterized by an optically variable effect which differs from the known optically variable effects described above and thus has corresponding advantages for decoration and security applications.

This object is achieved by a multi-layer body which has a first layer with a first surface and a second surface opposite the first surface, wherein the first surface of the first layer defines a base plane spanned by coordinate axes x and y, and moulded into the second surface of the first layer in a first area are a large number of facet faces which have in each case a minimum dimension of more than 1 μm and a maximum dimension of less than 300 μm, wherein each of the facet faces is determined by the parameters: form F of the facet face, area size S of the facet face, spacing H of the centroid of the facet face from the base plane, position P of the centroid of the facet face in the coordinate system spanned by the x-axis and the y-axis, angle of inclination Ax of the facet face about the x-axis towards the base plane, angle of inclination Ay of the facet face about the y-axis towards the base plane and azimuthal angle Az of the facet face defined by the rotation of the facet face about a z-axis perpendicular to the base plane, wherein one or more of the parameters F, S, H, P, Ax, Ay and Az of the facet faces arranged in the first area is varied, in the first area, pseudorandomly within a variation range predefined in each case for the first area, and at least one reflective second layer is applied to each of the facet faces. This object is furthermore achieved by a process for producing a multi-layer body in which a first layer with a first surface and a second surface opposite the first surface is provided, wherein the first surface of the first layer defines a base plane spanned by coordinate axes x and y, in which a large number of facet faces are moulded into the second surface of the first layer, wherein each of the facet faces has a minimum dimension of more than 1 μm and a maximum dimension of less than 300 μm, each of the facet faces is determined by the parameters: form F of the facet face, area size S of the facet face, spacing H of the centroid of the facet face from the base plane, position P of the centroid of the facet face in the coordinate system spanned by the x-axis and the y-axis, angle of inclination Ax of the facet face about the x-axis towards the base plane, angle of inclination Ay of the facet face about the y-axis towards the base plane and azimuthal angle Az of the facet face defined by the angle of rotation of the facet face about a z-axis perpendicular to the base plane, and one or more of the parameters F, S, H, P, Ax, Ay and Az of the facet faces arranged in a first area is varied, in the first area, pseudorandomly within a variation range predefined in each case for the first area, and in which a reflective second layer is applied to the large number of facet faces.

Here pseudorandomly means that the respectively varied parameters F, S, H, P, Ax, Ay and Az cannot adopt all possible values, but only values from a more narrow, predefined variation range. The pseudorandom variation here can take into consideration all values from this more narrow, predefined variation range with equal probability. However, it is also possible to use a (mathematical) function for the probability of the consideration of a value from this variation range. Examples of such functions are the Gaussian function as well as an inverse Gaussian function.

The invention here is based on the knowledge that, through the moulding of the facet faces as specified above in a layer of a multi-layer body, an optically variable effect can be generated which, for a human observer, differs from the optically variable effect achievable by the above-named processes according to the state of the art. The optically variable effect according to the invention can be characterized, for example, depending on the choice of the reflective layer, by a characteristic depth effect and/or by characteristic colour and/or glitter effects. In particular, the optically variable effect is characterized in that it has no, or almost no, disruptive diffractive components, for example rainbow effects. The optically variable effect is thus largely achromatic. As large as possible a difference from the known diffractive effects can thereby be achieved. Furthermore, this makes it easier for laypeople to clearly identify the effect. It is furthermore also particularly advantageous here that due to the invention these optically variable effects can be produced and are reproducible particularly cost-effectively using large-scale processes. In addition, the optically variable effects produced by the facet faces of a multi-layer body according to the invention can also be integrated into a film body registered with other elements which display a different optically variable effect.

Advantageous embodiments of the invention are described in the dependent claims.

The reflective second layer can be applied over the whole surface of the facet faces and the surfaces between the facet faces, but it can also be present only on the facet faces or only on parts of the facet faces and not present in the remaining areas of surface. This can be achieved for example via so-called demetallization processes, in particular known etching processes or washing processes. Furthermore, a further reflective second layer, e.g. ZnS, which can in particular be transparent or translucent, can be applied to a partially present reflective second layer, e.g. aluminium.

According to a preferred embodiment example of the invention, the reflective second layer is provided in the first area in each case in the area of the facet faces and not provided in the area not overlaid with the facet faces. For this, the second reflective layer is for example applied over the whole surface of the first layer at least in the first area and then removed again in the partial sections of the first area which are not overlaid with the facet faces.

According to a preferred embodiment example of the invention, the reflective second layer is provided in the first area in each case in the area of the facet faces and not provided in a first partial section of the first area which is not overlaid with the facet faces. Furthermore, a second partial section which is not overlaid with the facet faces and in which the reflective second layer is provided is preferably provided in the first area. Here it is also possible for a large number of first and/or second such partial sections to be provided. The at least one partial section and/or the at least one second partial section are preferably formed with a pattern. Preferably, the at least one partial section forms a background area and the at least one second partial section forms a pattern area or vice versa. Preferably, the at least one first partial section and the at least one second partial section here are formed such that, when viewed with light passing through, they generate for the human observer an optically perceptible item of information which is determined by the form of the at least one first partial section and of the at least one second partial section. Preferably, the at least one first partial section and the at least one second partial section here have a lateral dimension of more than 300 μm.

Preferably, the multi-layer body is formed transparent in the first partial sections or in the first partial section.

With regard to the arrangement of the facet faces in first partial sections and second partial sections, a viewing direction perpendicular to the base plane is assumed here.

The visual appearance of the multi-layer body can be further improved by these measures.

According to a preferred embodiment example of the invention, a background structure is moulded into the second surface of the first layer in a partial section of the first area which is not overlaid with the facet faces. The background structure here is preferably formed by a diffractive and/or refractive relief structure which generates a second optical effect differing from the optical effect of the facet face.

Preferably, the partial section of the first area overlaid with the background structure is shaped in the form of a background area which surrounds one or more, preferably all, of the facet faces.

The background structure preferably comprises a relief structure, in particular a diffractive relief structure which generates movement and/or morphing effects as optical effect. Preferably, the partial section overlaid with the background structure here is divided into a large number of zones which are each overlaid with a diffractive diffraction grating, wherein at least one of the grating parameters of adjacent zones is different, in particular the spatial frequency and/or the azimuthal angle of the diffractive structures of adjacent zones is different.

Furthermore, it is also preferred if the background structure comprises microscopic relief structures with diffractive and/or refractive action which generate a macroscopic three-dimensionality similar to a refractive anamorphic lens or optically distorting free-form effect or another effect with three-dimensional action.

The proportion of the surface covered by the partial surfaces of the first area overlaid with the facet faces relative to the partial surfaces of the first area overlaid with the background structures and the facet faces is preferably less than 70%, further preferably less than 50%, further preferably less than 30% when viewed perpendicular to the base plane.

Preferably, the centroids of adjacent facet faces are at a distance of less than 300 μm, further preferably less than 100 μm, from each other. Preferably, the centroids of adjacent facet faces are at a distance of between 2 μm and 300 μm, furthermore between 5 μm and 100 μm, further preferably between 5 μm and 50 μm, from each other.

The minimum distance between a point on an outside edge of a facet face and a point on the outside edge of an adjacent facet face is preferably less than 300 μm, further preferably less than 100 μm, further preferably less than 50 μm and preferably between 0 and 300 μm, further preferably between 0 μm and 100 μm, further preferably between 1 μm and 50 μm. This dimensioning rule preferably applies to all facet faces in the first area.

Such an arrangement of the facet faces relative to each other results, in particular with the arrangement of a background structure, in advantages with respect to the visibility and superimposition of the optical information provided by the facet faces and the background structure.

In this connection, it is furthermore particularly advantageous to mould a relief structure which forms a zero-order diffraction structure into the first layer in the partial sections of the first area which are not overlaid with the facet faces. Preferably, this structure here has a spacing between adjacent structural elements which is smaller than the wavelengths of visible light. Furthermore, structures the depth to width ratio of which is greater than 0.5, further preferably greater than 1, are preferably used as structural elements for this structure.

With the aid of these structures, firstly, the demetallization of the partial sections of the first area which are not overlaid with facet faces can be controlled.

In addition, it is particularly advantageous to apply a further reflective layer over the whole surface after the partial removal of the reflective layer, with the result that the second layer has reflective properties that are different in different partial sections of the first area, and has a different layer structure. Thus, if a metal layer is initially applied as a reflective layer to the first layer and, after partial removal of this metal layer in the partial sections of the first area not overlaid with the facet faces, a dielectric reflective layer is applied over the whole surface, for example a transparent or translucent HRI layer, for example ZnS, two different optical effects result, in the partial sections of the first area overlaid with the facet faces and in the partial sections of the first layer not overlaid with the facet faces: In the partial sections not overlaid with the facet faces, because of the combination of the dielectric reflective layer and the zero-order diffraction structures, a colour tilt effect is generated which occurs when the multi-layer body is rotated. This optical effect is then superimposed by the optical effect, already mentioned above, brought about by the facet faces.

Furthermore, it is particularly advantageous here if these two effects are set such that they display the same colour from a first viewing angle and a different colour from a second viewing angle. A security feature that is easy to check can hereby be provided.

According to a preferred embodiment example of the invention, the second layer has a thin-film layer system which generates a colour shift effect dependent on the angle of view in particular in the visible wavelength range. Such a thin-film layer system is characterized in particular by one or more spacer layers. The optically active layer thickness of these spacer layers satisfies the $\lambda/2$ or $\lambda/4$ condition for a wavelength $\lambda$, preferably for a given angle of view, in particular in the range of visible light. The thin-film layer system here can consist of a single layer, of a layer system with one or more dielectric layers and one or more metallic layers or of a stack of layers with two or more dielectric layers.

Furthermore, it is also possible for the colour shift effect to be generated by the combination of an HRI layer (HRI=High Refraction Index), in particular a transparent or translucent HRI layer, with microstructures, e.g. subwavelength gratings, additionally introduced into the facet faces.

In addition to a thin-film layer system, the second layer here can also have one or more further layers. The use of a thin-film layer system in the second layer results in interesting colour change effects which are characterized, with a corresponding variation of the above-listed parameters, by a high depth effect as well as coloured glitter effects.

Furthermore, it is also advantageous that the second layer comprises an oriented liquid crystal layer, in particular a cholesteric liquid crystal layer, a metal layer, an HRI layer or an LRI layer (HRI=High Refraction Index, LRI=Low Refraction Index), or a layer comprising a lacquer, a magnetic pigment, a polymer doped with an ink, nanoparticles or luminescent materials. The first layer is preferably a transparent layer, in particular a layer of a transparent replication lacquer. Stamped into the replication lacquer are surface structures which satisfy an optical function (diffraction, refraction, reflection) and/or another, non-optical function. Such structures, e.g. a diffractive line grating arranged in particular as a pattern with 500 to 5000 lines/mm, can for example serve to align the molecules of the liquid crystal layer in particular in a pattern and to thereby fix its polarization action or its polarization characteristics in particular in a pattern.

According to a preferred embodiment example of the invention, the multi-layer body generates an optically variable first item of information recognizable for the human observer, wherein to generate the first item of information the angles of inclination Ax and Ay of the facet face in the first area are varied according to a function $F(x,y)$. Here, it is possible firstly for one or more of the parameters F, S, H, P or Az in the first area to additionally be varied pseudorandomly within its respective variation range predefined for the first area.

A particularly interesting optically variable impression can, however, be realized in addition by the following preferred embodiment of the invention: In this embodiment, the angles of inclination Ax and Ay of the facet faces in the first area are in each case determined according to an additive or multiplicative superimposition of the angles of inclination Ax and Ay determined by a function $F(x,y)$ with the pseudorandom variation of the angle of inclination Ax and/or of the angle of inclination Ay within the respective variation range predefined for the first area. The function $F(x,y)$ here is chosen such that it varies the angles of inclination Ax and Ay to generate an optically variable first item of information.

Preferably, the predefined variation range of the angles of inclination Ax and Ay here is chosen smaller than the average gradient of the function $F(x,y)$ in the first area, in particular is chosen between 0.1 times and 1.9 times the average gradient of the function $F(x,y)$. It is hereby ensured that the first optically variable item of information in its appearance is not too strongly superimposed with additional optically variable effects, such as an increased depth impression, glitter and texture effects, and thus the recognizability of the first item of information is not impaired.

It is to be noted that different sequences for the various variations—e.g. of the angles of inclination Ax and Ay as well as the azimuthal angle Az of the facet face, the application of the function $F(x,y)$ to be superimposed and the inclusion of the pseudorandom variation—lead to different results.

Preferably, the function $F(x,y)$ describes a three-dimensional free-form surface with one or more free-form elements. The angles of inclination Ax and Ay here are preferably determined by the respective surface normal of the three-dimensional free-form surface in the centroid of the respective facet face.

The free-form elements have for example the form or the outline of an alphanumeric character, a geometric figure or another object. Furthermore, the three-dimensional shape of the free-form elements is preferably chosen such that they generate a lens-like magnification, demagnification or distortion effect. For this, the free-form elements preferably have, in a sectional plane perpendicular to the base plane, a lens-like shape, for example a shape which corresponds to a corresponding section through a converging, diffuser or anamorphic lens. The three-dimensional free-form surface preferably has a common basal plane from which the one or more free-form elements rise or fall.

According to a preferred embodiment example of the invention, the function $F(x,y)$ thus describes, in the area of a free-form element, a free-form surface in the form of a lens or a lens transformed to represent an alphanumeric character, a geometric figure or another object.

The outlines of the free-form elements in a sectional plane parallel to the base plane here preferably correspond to the first item of information and have for example the shape of a letter, a symbol, a geometric figure or another object.

According to a further preferred embodiment example of the invention, the function $F(x,y)$ describes a cut section of a surface of a three-dimensional object as free-form element. The three-dimensional shape of a free-form element thus corresponds for example to a cut section of a sculpture, an ornament or relief or of another three-dimensional object, for example a building, a human figure etc.

Preferably, adjacent maxima of a free-form element are spaced apart from each other in the direction of the z-axis, relative to a projection onto the base plane, by more than 0.5 mm, further preferably more than 1 mm and still further preferably more than 3 mm. Furthermore, the minimum dimension of a free-form element, relative to a projection onto the base plane, is more than 2 mm, further preferably more than 4 mm.

By minimum dimension of a free-form element, relative to a projection onto the base plane, is meant here the width of the free-form element or the spacing between the opposite boundary points of the projection surface that lie on a line of intersection through the centroids of the projection surface and have the smallest spacing compared with the remaining opposite points.

Preferably, the dimensions (length, width) of the free-form element determined by the outline of the projection surface of the free-form element on the base plane here are in the range of from 2 mm to 50 mm, further preferably from 4 mm to 30 mm.

According to a preferred embodiment example of the invention, the function F(x,y) is constant and differentiable in the area of the free-form element and/or the function F(x,y) is composed of flat and curved areas of surface in the area of the free-form element, wherein preferably the radius of curvature of the curved areas of surface is not less than 1 mm, further preferably not less than 3 mm.

According to a preferred embodiment example of the invention, for the pseudorandom variation of one or more of the parameters F, H, P, Ax, Ay and Az within the respectively predefined variation range, a parameter variation value is selected pseudorandomly from a predefined group of parameter variation values. The predefined group preferably comprises between 3 and 30, in particular between 3 and 10 parameter variation values. The pseudorandom variation thus does not take place in the sense of a purely random process to be encountered in nature, which can adopt all possible parameters within the variation range, but it has a predetermined granularity. It has surprisingly been shown that a particularly striking optically variable effect hereby appears. In addition, it has been shown that, even with 3 parameter variation values, diffractive effects—which can occur with very small facet faces—can be largely eliminated. In this way, achromatic effects can also be realized with these small facet faces. Such achromatic effects are clearer than effects which are still superimposed with diffractive effects. Thus, they are easier to identify and more aesthetically appealing.

Preferably, the angle of inclination Ax and/or Ay of the facet faces in the first area is varied pseudorandomly in a variation range of from −45° to +45', further preferably from −30° to +30°, particularly preferably −15° to +15°, in particular to achieve a glitter effect.

Furthermore, it is advantageous to vary the azimuthal angle Az of the facet faces in the first area pseudorandomly in a variation range of from −90° to +90°, further preferably from −45° to +45° and particularly preferably −15° to +15°.

According to a further preferred embodiment example of the invention, the spacing H between the centroid of the facet faces and the base plane in the first area is varied pseudorandomly. The variation range defined by the difference between the maximum spacing $H_{max}$ and the minimum spacing $H_{min}$, between which the spacing H of the facet face is varied pseudorandomly, here is preferably between 0.5 μm and 8 μm, further preferably between 0.5 μm and 2 μm.

According to a preferred embodiment example of the invention, the facet faces are arranged according to a two-dimensional grid spanned by the x-axis and the y-axis. However, it is also further possible—as already stated above—for the position P of the facet faces to be varied pseudorandomly, with the result that the facet faces are no longer arranged according to a regular grid.

In this case, according to a preferred embodiment example of the invention, the process is as follows: The position P of each of the facet faces in the first area is determined by a pseudorandom shift of the centroid of the respective facet face from a respective normal position in x- and/or y-direction. The normal position of the centroid of the respective facet face here is preferably likewise determined by a two-dimensional grid spanned by the x-axis and the y-axis, by which the normal position of the centroid of the respective facet face in the base plane is defined for the facet faces arranged in the first area.

Preferably the limit values of the variation range of the pseudorandom shift from the respective normal position in x- and/or y-direction are between 0% and 100%, preferably between 0% and 50% and particularly preferably between 0% and 20% of the dimension of the facet face in the direction of the x-axis or the y-axis. With a dimension Dx of the facet face in the direction of the x-axis, the limit values of the variation range are thus +Dx and −Dx, multiplied by the factor given above. This applies correspondingly for the dimension in the direction of the y-axis.

The grid width of the grid in the direction of the x-axis and/or the y-axis is preferably between 1.2 times and 2 times the dimension of the facet face in the direction of the x-axis or y-axis. The pseudorandom shift can result in adjacent facet faces overlapping. This can be achieved e.g. by suitable algorithms during the generation of the arrangement of the facet faces in the master structure. For example, an algorithm can generate the facet faces one after the other, and, whenever a newly added facet face would, at least partially, overlay the same surface in the multi-layer body as one of the already virtually present facet faces, reduce the lateral extent of this newly added facet face. Alternatively, the algorithm can e.g. also shift the newly added facet face laterally.

Here, it has proved particularly worthwhile to choose the variation range of the random shift between +D/2 and −D/2, wherein D is the dimension of the facet face in the direction of the x-axis or of the y-axis, and to fix the grid width of the grid in the direction of the x-axis and/or of the y-axis at 3/2 times the dimension D of the facet face in the direction of the x-axis or y-axis.

The form F of the facet face is preferably selected from the group: square, rectangle, regular polygon, circle, conic section and random polygon. If the form F of the facet face is chosen pseudorandomly in the first area, then, pseudorandomly, there is a selection from a group of differently shaped facet faces which preferably have one of the above-described shapes. A simple example is a rectangle with a width a and a length b, wherein a and b in each case are chosen pseudorandomly.

As already stated above, each of the facet faces has a minimum dimension of more than 1 μm, preferably of more than 3 μm, and a maximum dimension of less than 300 μm. It has furthermore proved its worth for the minimum dimensions of the facet faces, to be between 1 μm and 20 μm, preferably between 3 μm and 10 μm. The maximum dimension of the facet faces is preferably between 5 μm and 100 μm, further preferably between 5 μm and 50 μm and particularly preferably between 5 μm and 30 μm.

By minimum dimension of the facet face is meant here the width and by maximum dimension of the facet face is meant here the length of the facet face. The minimum dimension is given by the spacing between the boundary points of the facet face that lie on a line of intersection through the centroid of the facet faces and have the smallest distance between each other compared with the remaining boundary points arranged adjacent to each other in such a way.

Preferably, the minimum dimension is present in the direction of the largest gradient of the facet face.

According to a further preferred embodiment example of the invention, the height $H_f$ of the facet faces, i.e. the extent of the facet face in z-direction, is varied pseudorandomly in the first area. The variation range defined by the difference between the maximum height and the minimum height between which the height $H_f$ of the facet face varies pseudorandomly, divided by the maximum height ($\Delta h=(h_{max}-h_{min})/h_{max}$) here is preferably between 50% and 100%, further preferably between 70% and 100% and particularly preferably between 85% and 100%.

In a preferred embodiment of the invention, the facet faces are designed such that the height $H_f$ is smaller than 2 µm, preferably smaller than 1 µm and particularly preferably smaller than 0.5 µm. Such structures can be produced well not only using UV replication, but also by thermal replication. In thermal replication, the facet faces are moulded in a replication lacquer by means of a stamping tool using heat and pressure. In UV replication, the replication lacquer consists of a UV curable material and the facet faces are moulded into the surface of the replication lacquer layer by means of a stamping tool and simultaneous and/or subsequent UV radiation. In order to still be able to achieve meaningful values for the angles of inclination Ax and Ay, e.g. ±20°, the facet faces in the direction of the largest gradient must be smaller than 6 µm, preferably smaller than 3 µm and particularly preferably smaller than 1.5 µm. At the same time, each of the facet faces has a minimum dimension of more than 1 µm. The maximum dimension of such facet faces can be much greater than the minimum dimension. It has now unexpectedly been shown that such facet faces have almost no diffraction if at least one parameter F, H, P, Ax, Ay and Az of the facet faces varies pseudorandomly. A predefined group of parameter variation values which comprises e.g. 3 values can already prevent or suppress the production of diffractive effects. This is due to the fact that the pseudorandom variation breaks the regularity which is necessary for diffractive effects.

For all embodiments in which the maximum height $H_{max}$ of the facet faces is to be kept below a given limit value, it must be taken into consideration during the generation of the arrangement of the facet faces to optionally split the facet faces that exceed the maximum height $H_{max}$ into two or more smaller facet faces.

If, e.g. for production reasons, e.g. because of limitations during the thermal replication or UV replication, this maximum height is 2 µm and the facet faces have a surface area S of 10 µm×10 µm, at least all facet faces which have an angle of inclination of more than $\sin^{-1}(2/10) \approx 11.5°$ must be split into two or more facet faces. These smaller facet faces are designed such that they do not exceed the maximum height $H_{max}$ at the desired angle of inclination. This can be achieved for example by suitable algorithms during the generation of the master structure for the replication.

The area size S of the facet faces is preferably between 5 µm² and 6000 µm², further preferably between 5 µm² and 300 µm². If the area size S of the facet faces is varied pseudorandomly, the variation range is preferably 10% to 50% of the average area size of the facet faces.

According to a preferred embodiment example of the invention, the facet faces have an outline shape in the form of a symbol, a letter or another object. This additional information is concealed from the human eye without the use of a tool. Thus, a concealed second item of optical information is provided which can be made visible by means of a tool, for example a magnifying glass.

Furthermore, it is also possible for the one or more facet faces to additionally be overlaid with a diffractive structure, a zero-order diffraction structure, an isotropic or anisotropic matte structure or a nanotext, nanomotifs or a functional structure with no optical action. The facet faces here can be overlaid with such an additional structure over the whole surface or only in areas. Further interesting optically variable effects or functional effects can hereby be generated. Examples of this are the optical effects described in U.S. Pat. No. 4,484,797 and WO 03/059643 A1 based on so-called "resonant gratings" which are modified by the facet faces. Another example is the alignment of molecules in a liquid crystal material, which is applied to the facet faces, to set the polarization properties of the liquid crystal material.

According to a preferred embodiment example of the invention, the multi-layer body has a second area, wherein one or more of the parameters F, S, H, P, Ax, Ay and Az of each of the facet faces arranged in the second area is varied pseudorandomly in the second area within a variation range predefined in each case for the second area. The parameters which are varied pseudorandomly in the first and in the second area here are preferably chosen differently and/or at least one variation range of the varied parameters is chosen differently in the first and in the second area. Preferably, the at least one variation range in the first area here differs from that in the second area by at least 20%, further preferably 50%. It is hereby achieved that the first and the second area convey a different optically variable impression.

According to a preferred embodiment example of the invention, the multi-layer body has a third area in which a relief structure selected from the group: diffractive relief structure, zero-order diffraction structure, isotropic or anisotropic matte structure or in particular macrostructure with refractive action is moulded into the second surface of the first layer.

A further optically variable effect which differs from the optically variable effect generated in the first area and/or second area is thus generated by the multi-layer body through the relief structures arranged in the third area. However, in the third area there can also be a volume hologram layer or a security print.

Preferably, the first, the second and/or the third area here border each other at least in areas, with the result that, when the multi-layer body is viewed, areas of the surface bordering each other which display different optically variable effects are visible for the human observer. Here the invention achieves the advantage that the generation of the optically variable effect visible in the first and/or second area of surface, by means of the facet faces as specified above, makes possible a registration-accurate arrangement of this optical effect relative to the optical effects generated by means of the relief structures in the third area.

The multi-layer body is preferably formed as a transfer film, as a laminating film, as a packaging film, as a security element or security document and is preferably used for decorative purposes or as an element for the security of value documents, ID documents or for product assurance.

The multi-layer body can be an integral constituent of a security document in which the facet faces are moulded directly into a surface of the security document. The surface can be for example a lacquer layer or a plastic layer printed on or otherwise applied which either was applied separately before the moulding or even represents the substrate of the security document, for example an ID document made of polycarbonate or a banknote with a polymer substrate.

It is also possible here for the surface of the security document into which the facet faces are moulded to have other additional security features. For example, it is possible for the surface of the security document to be formed by a lacquer with optically variable pigments in which facet faces are additionally moulded. If the optically variable pigments form a motif in the surface, it is advantageous to mould the facet faces registration-accurate relative to this, i.e. positionally accurate relative to this motif.

After the moulding of the facet faces into the surface of the security document, it is advantageous to apply a sealing protective lacquer in order to protect the security document from physical and/or chemical influences.

BRIEF DESCRIPTION OF THE DRAWINGS

The invention is explained by way of example below with reference to several embodiment examples with the aid of the attached drawings.

FIG. 2b shows a schematic sectional representation of a cut section of the security element according to FIG. 2a.

FIG. 8a-FIG. 8d each show several schematic representations to illustrate functions described by a free-form surface.

FIG. 10a-FIG. 10c show pictures illustrating the optically variable impression of a multi-layer body.

DETAILED DESCRIPTION OF THE INVENTION

Figure 1:
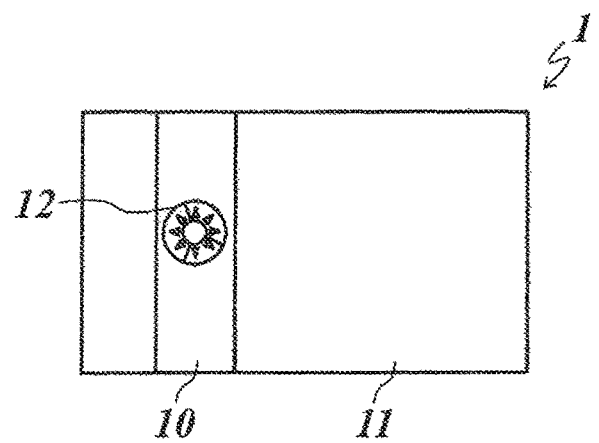
FIG. 1 shows a schematic top view of a security document with a security element.

FIG. 1 shows a security document 1. The security document 1 is preferably a value document, such as a banknote. However, it is also possible for the security document 1 to be an ID document, a credit card or the like.

The value document 1 has a carrier substrate 11 as well as a security element 10, applied to the carrier substrate 11 or integrated into the carrier substrate 11, in the form of a multi-layer film body. The security element 10 preferably has a strip-like shape with a width of between 1 mm and 20 mm, further preferably between 2 mm and 10 mm. Furthermore, the security element 10 preferably extends over the whole width of the carrier substrate 11, as shown by way of example in FIG. 1.

The security element 10 has one or more optical security features, of which one security feature 12 is shown in FIG. 1. Thus, in addition to the security feature 12, another one or more further, in particular optically recognizable, security features can also be provided on the security element 10. Here, it is also possible for the substrate 11 of the value document 1 in the area of the security element 10 to have one or more transparent areas or corresponding window-like recesses, in the area of which the security element 10 displays a security feature visible in transmission. Thus, it is also possible for such a transparent area of the carrier substrate 11 or such a window-like recess in the carrier substrate 11 to be provided in the area of the security feature 12.

The carrier substrate 11 preferably consists of a paper substrate. However, it is also possible for the carrier substrate 11 to consist of a plastic substrate or a multi-layer substrate which consists of several layers selected from the group: plastic layers, metal layers, fibre layers and paper layers.

Furthermore, it is possible for the security document 1 to have, in addition to the security element 10, still further security elements and for the security element 10 to be overprinted at least in areas with one or more layers, for example to be overprinted in areas with a security print.

Furthermore, it is also possible for the security element 10 to have another shape, for example to be shaped in the form of a patch, and also for the security document 1 to have a shape other than that shown in FIG. 1, for example to be shaped in the form of a card, a passport book etc.

Figure 2A:
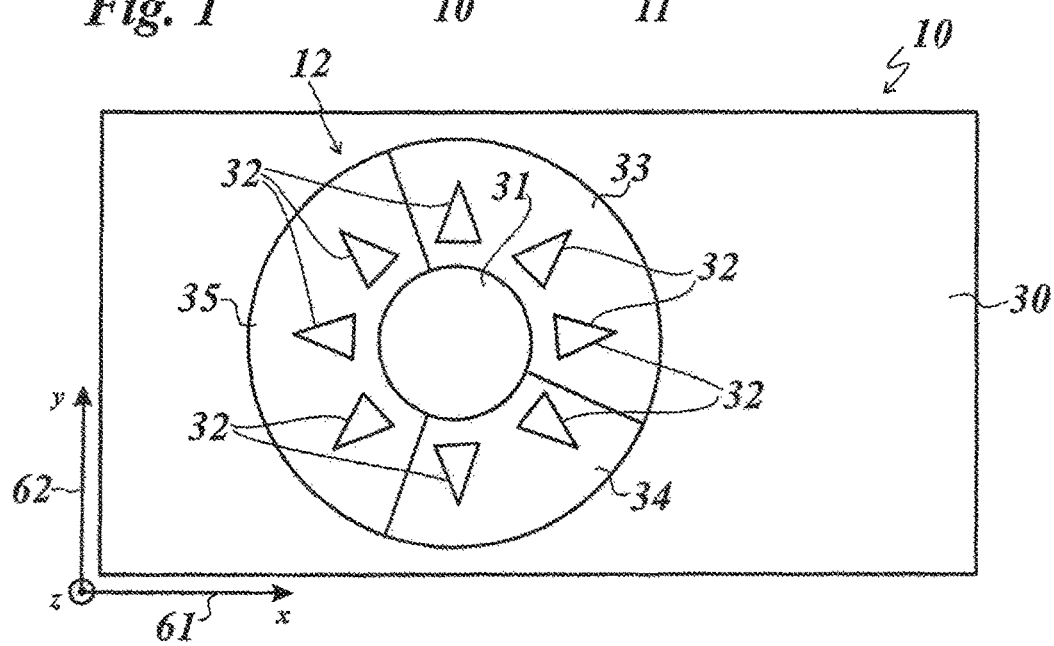
FIG. 2a shows a schematic top view of a cut section of the security element according to FIG. 1.
Figure 2B:
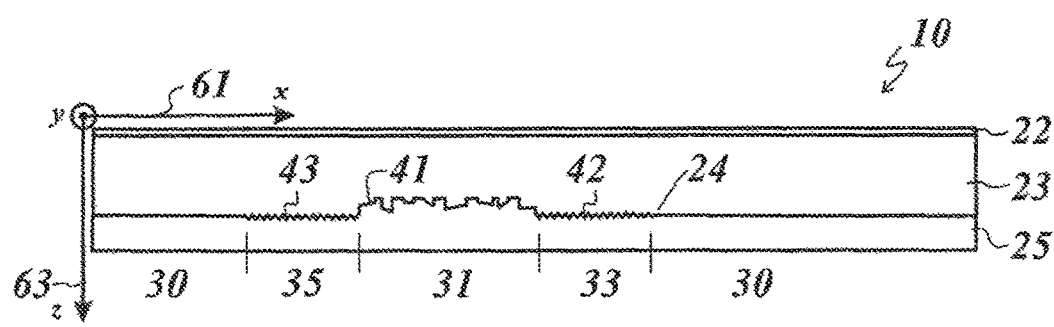

FIG. 2a and FIG. 2b illustrate the basic structure of the security element 10 with the help of a cut section of the security element 10 in the area of the security feature 12.

The security element 10 has a protective layer 22, a transparent layer 23 and an adhesive layer 25. The layer 24 preferably consists of a transparent, semi-transparent or opaque reflective layer or a transparent, semi-transparent or opaque thin-film layer system.

The protective layer 22 preferably consists of a protective lacquer layer with a layer thickness of between 0.5 μm and 20 μm.

The transparent layer 23 preferably consists of a replication lacquer layer with a layer thickness of between 1 μm and 50 μm, further preferably between 2 μm and 20 μm.

The adhesive layer 25 is preferably a layer of a thermally activatable adhesive with a layer thickness of between 1 μm and 5 µm. Furthermore, it is also advantageous to use a UV activatable adhesive as adhesive for the adhesive layer 25.

As indicated in FIG. 2a and FIG. 2b, a base plane spanned by coordinate axes x and y is defined by the upper surface of the layer 23, as well as furthermore a z-axis perpendicular to this base plane. FIG. 2a and FIG. 2d thus illustrate by way of example a three-dimensional coordinate system defined by the layer 23 with an x-axis, a y-axis and a z-axis which define corresponding spatial directions 61, 62 and 63. Here it is also possible for relief structures to also be shaped into the surface of the layer 23 lying on top and thus for the upper surface of the layer 23 not to be completely flat. In this case, the base plane is fixed by the flat areas of the upper surface of the layer 23.

The security feature 12 is composed of several areas 31, 32, 33, 34 and 35 which each display a different optical appearance. The areas 31 to 35 are furthermore surrounded by an area 30 which preferably displays no optically variable appearance. The area 30 can in particular have a matte structure or an anti-reflective structure.

In the area 31, a large number of facet faces which form a relief structure 41 in the area 31 are moulded into the lower surface of the layer 23. This also applies to the areas 32, in which a large number of facet faces is likewise moulded into the lower surface of the layer 23. In the areas 33, 34 and 35, in each case different diffractive relief structures are moulded into the lower surface of the layer 23, wherein here a diffractive relief structure 42 is moulded in the area 33 and a diffractive relief structure 43 is moulded in the area 35.

According to a preferred embodiment, a background structure is moulded into the first layer in a partial section of the first area which is not overlaid with the facet faces.

Figure 2C:
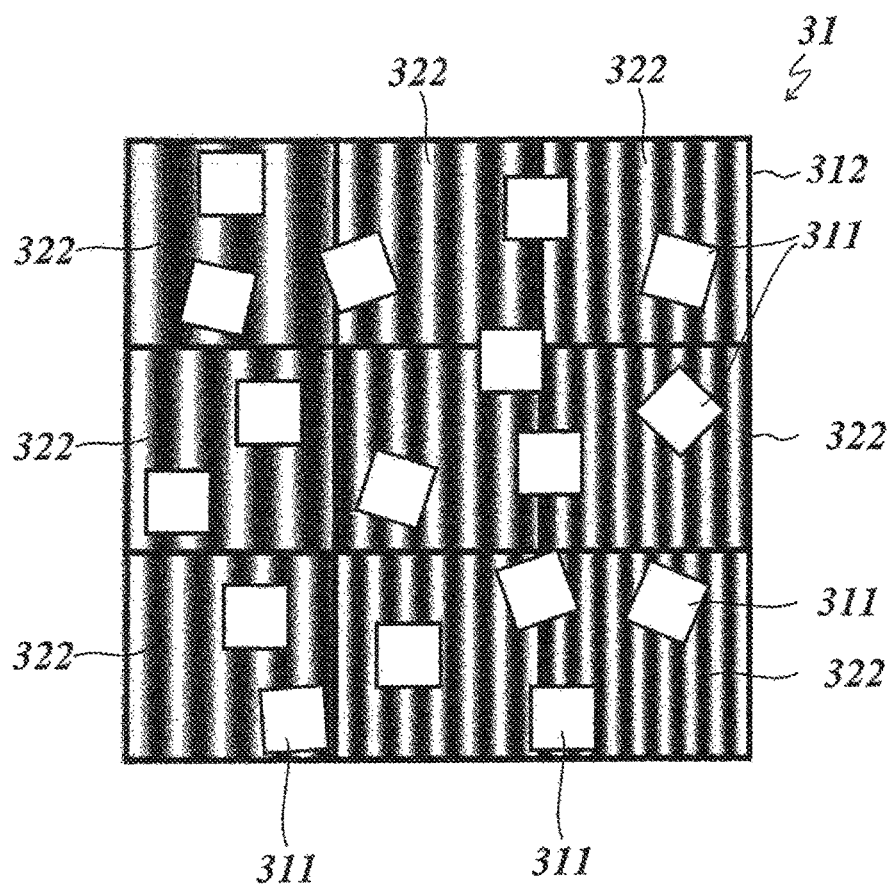
FIG. 2c shows a schematic top view of a cut section of a security element.
Figure 2D:
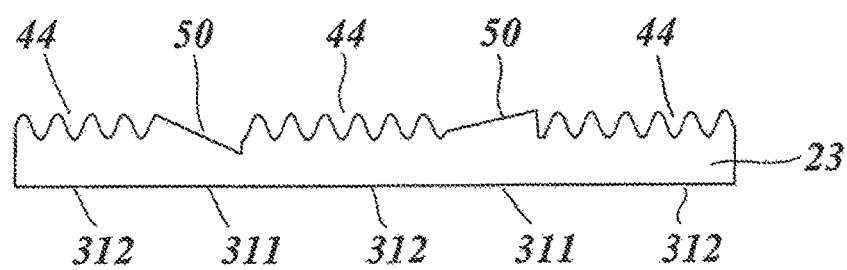
FIG. 2d shows a schematic sectional representation of a cut section of the security element according to FIG. 2c.

FIG. 2c and FIG. 2d illustrate by way of example an embodiment in which the area 31 has firstly a large number of partial sections 311 which in each case are overlaid with a facet face 50, and furthermore has a partial section 312 which is overlaid with a background structure 44. As shown in FIG. 2c, the partial section 312 here is preferably shaped as a background area for the facet faces 50.

As background structure 44, moulded in the layer 23 in the partial section 312 is preferably a relief structure which produces movement and/or morphing effects as a second optical effect (e.g. as a Kinegram®). Such movement or morphing effects are described e.g. in EP 0 375 833 A1 and EP 0 105 099 A1 and reference is made to these documents in respect of the formation of the background structure 44.

As shown in FIG. 2c, the partial section 312 is divided into a large number of zones 322. A preferably linear diffraction grating is moulded in each of the zones 322, wherein preferably the diffraction gratings of adjacent zones 322 differ in at least one grating parameter, in particular in its azimuthal angle or its spatial frequency. Inside the respective zone 322, the grating parameters are preferably not varied. Alternatively, the orientation of the gratings or also other grating parameters or combinations of grating parameters of adjacent zones 322 can also be varied.

The second optical effect of the background structure 44 and the first optical effect of the facet faces 50 can complement one another. For example, it is possible to produce a "rolling bar" effect with the facet faces 50 and to produce a movement effect in the opposite direction with the background structure 44. As the structure sizes of the facet faces 50 and of the areas of surface arranged between them and overlaid with background structure lie below the resolution capacity of the naked eye, the two optical effects result in a joint optical effect from the superimposition of the two individual effects. It is thereby possible to produce particularly characteristic optical effects here.

Figure 2F:
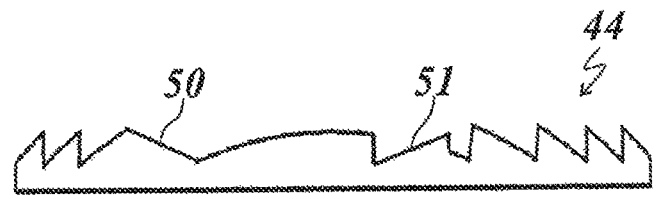
FIG. 2f shows a schematic sectional representation of a cut section of the security element according to FIG. 2e.
Figure 2E:
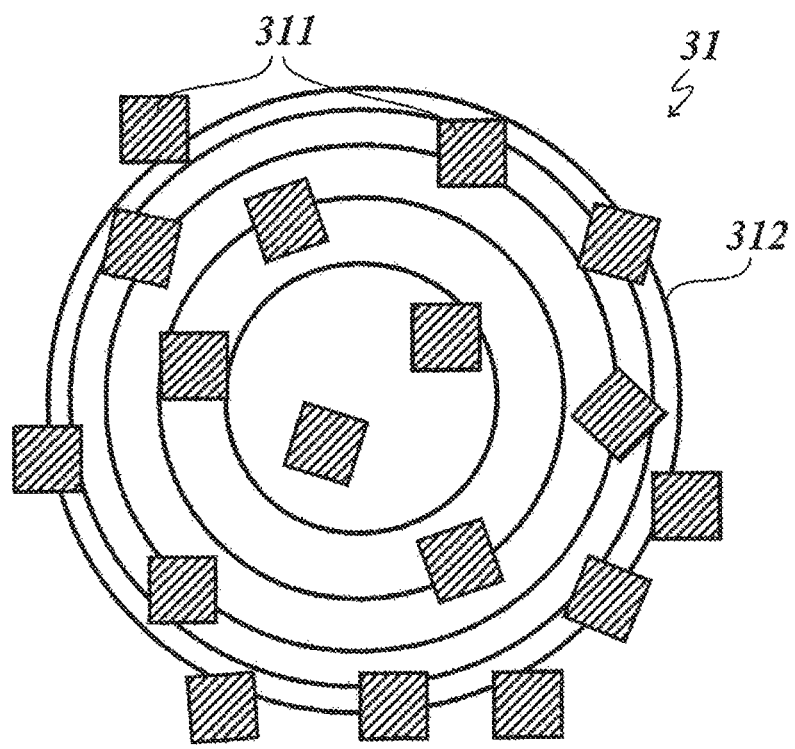
FIG. 2e shows a schematic top view of a cut section of a security element.

FIG. 2e and FIG. 2f illustrate a further embodiment in which in the partial sections of the first area which are not overlaid with the facet faces a relief structure with structures such as described e.g. in EP 1 562 758 B1 are provided in the first layer.

The areas 311 in which in each case preferably a facet face 50 is provided are thus preferably surrounded by a background area 312 in which such a background structure 44 is moulded. The background structure generates a so-called "surface relief" effect, i.e. microscopic surface structures with diffractive and/or refractive action which act like lenses are produced which simulate a macroscopic three-dimensionality similar to a refractive anamorphic lens or optically distorting free-form surface. Thus, apparently three-dimensionally acting structures can be produced, e.g. ornaments, symbols, alphanumeric symbols. In order not to impair the "surface relief" effect too strongly with the facet faces 50, the overlaying of the surface with the facet faces should rather be low. Typically, this overlaying of the surface should be less than 70%, preferably less than 50% and particularly preferably less than 30%.

In a first variant of this possibility, the facet faces 50 add a glitter effect to the "surface relief" effect. If the facet faces 50 are provided with colour or colour-effect-generating structures, such facets even add colour or colour-changing glitter effects to the "surface relief" effect. In this variant, it is advantageous if the overlaying of the surface with the facets is even lower, i.e. less than 20% or even less than 10%.

Another variant combines the function $F_{SR}(x,y)$ of the "surface relief" effect with the function $F(x,y)$ of the facet faces 50. The effects of the "surface relief" structures and the facet faces 50 can complement one another. For example, it is possible to produce a convex lens function with the "surface relief" effect and a movement function with a concave action with the facet faces 50.

Furthermore, it is possible for an area 31 of the security element 10 designed according to FIG. 2c to FIG. 2f furthermore to also be combined with an area overlaid with other relief structures and thus for example to replace the area 31 in the embodiment according to FIG. 2a and FIG. 2b while maintaining the design of the areas 32 to 35 according to FIG. 2a and FIG. 2b.

The relief structures 41, 42 and 43 or the background structure 44 here are moulded into the layer 23 which has a surface on which the three-dimensional negative mould or complementary mould of these relief structures is provided, preferably in one and the same production process, for example by means of a stamping tool. The layer 23 can thus consist for example of a thermoplastic replication lacquer layer and a stamping tool shaped as set out above is used as replication tool. Using heat and pressure, the relief structures 41, 42 and 43 or the background structure 44 here are moulded into the lower surface of the layer 23 in the same production process using heat and pressure. Alternatively, it is also possible for the layer 23 to consist of a UV curable replication lacquer and for the relief structures 41, 42 and 43 or the background structure 44 to be moulded into the lower surface of the replication lacquer layer by UV replication by means of the replication tool and simultaneous and/or subsequent UV radiation. Here too, the relief structures 41, 42 and 43 or the background structure 44 are preferably moulded by means of one and the same replication tool. It is hereby ensured that the relief structures 41, 42 and 43 or the background structure 44 are moulded into the layer 23 registration-accurate, i.e. positionally accurate in x- and/or y-direction, relative to each other and thus registration deviations are avoided, i.e. tolerances in the position relative to each other which occur due to the introduction of the relief structures 41, 42 and 43 or the background structure 44 by means of different replication tools and consecutive production processes. However, it is also possible to introduce the relief structures of the areas 31-35 into the layer 23 in respective consecutive replication steps.

Figure 3A:
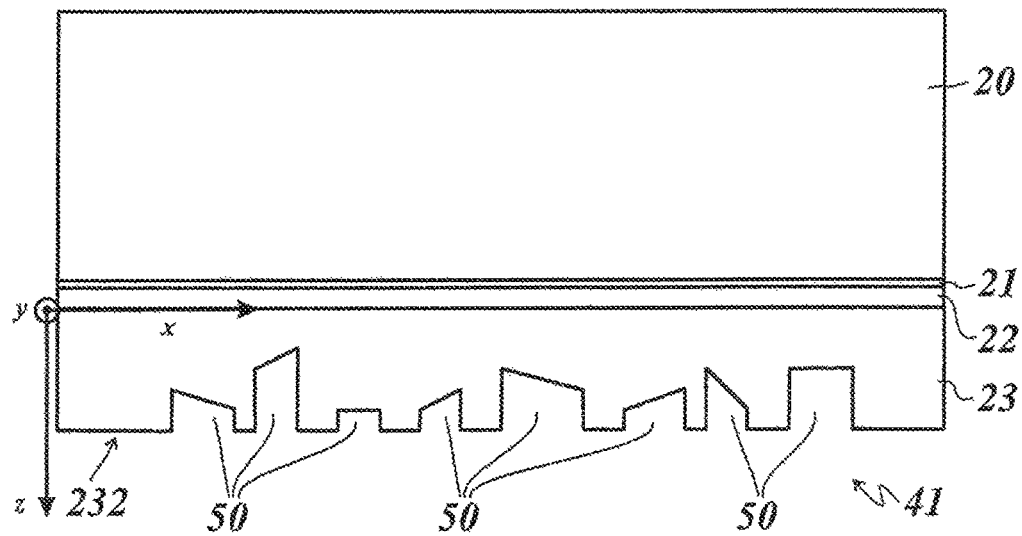
FIG. 3a, FIG. 3b, FIG. 3c, FIG. 3d and FIG. 3e each show schematic sectional representations of cut sections of a transfer film.
Figure 3B:
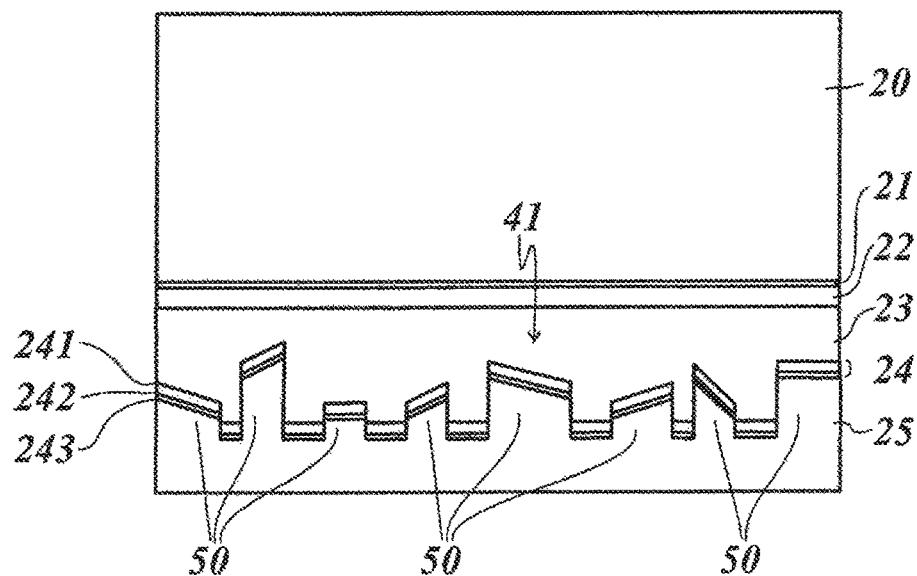

FIGS. 3a and 3b illustrate by way of example a possible production process for producing the security element 10.

First a detachment layer 21 and then the protective layer 22 are applied to a carrier film 20 in consecutive steps. The carrier film 20 here is preferably a plastic film with a layer thickness of between 6 µm and 300 µm. The plastic film here preferably consists of PET or BOPP. The detachment layer 21 preferably has a layer thickness of between 0.1 µm and 0.5 µm and preferably has wax components. However, it is also possible to dispense with the detachment layer 21.

Then—as already described above—the layer 23 is applied to the protective layer 22 and at the same time or in a subsequent step the associated relief structures, for example the relief structures 41, 42 and 43 or the background structure 44, are moulded into the exposed surface of the layer 23 in the areas 31 to 35. In the area 30, preferably no relief structure is moulded into the exposed surface of the layer 23.

FIG. 3a now shows by way of example a cut section of the area 31 in which the relief structures 41 are moulded into the layer 23. As shown in FIG. 3a, a large number of facet faces are here moulded into the exposed surface 232 of the layer 23. Each of the facet faces here has a minimum dimension of more than 1 µm and a maximum dimension of less than 300 µm, i.e. a width of more than 1 µm and a length of less than 300 µm. Preferably, the minimum dimensions of the facet faces here are between 1 µm and 20 µm, particularly preferably between 1 µm and 10 µm and the maximum dimension of the facet faces is between 5 µm and 100 µm, preferably between 5 µm and 50 µm and particularly preferably between 5 µm and 30 µm.

In the embodiment examples according to FIG. 2c to FIG. 2g, the area 31 has in each case only one facet face 50 which is surrounded by the background structure 44, as shown for example in FIGS. 2d and 2f. The facet faces 50 of the embodiment examples according to FIG. 2c to FIG. 2g are preferably shaped and arranged as described with reference to FIG. 3a to FIG. 10c, with the result that reference is made in this respect to these embodiments.

Figure 3C:
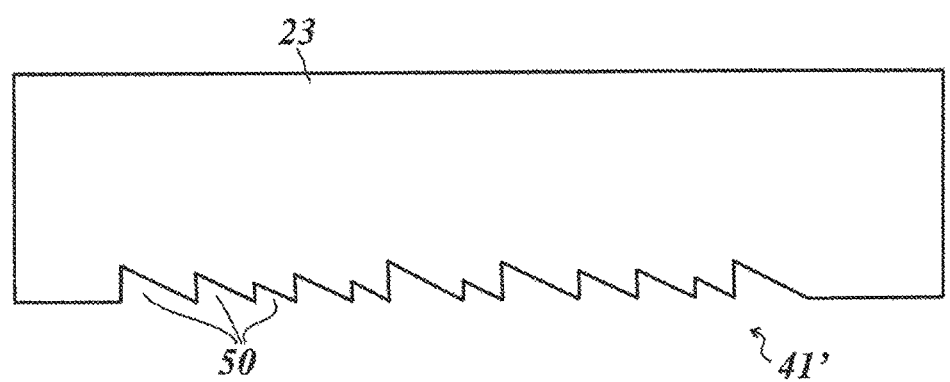

FIG. 3c shows a cut section of a further variant in which a relief structure 41' is moulded into the layer 23. The relief structure 41' has facet faces 50 with a structure height $H_f$ smaller than 2 µm. Here, the dimension of the facet faces in the direction of the largest gradient of the facet faces is varied pseudorandomly, wherein the parameter variation value is selected from a pseudorandom group of only three parameter variation values.

Each of the facet faces 50 is determined by the parameters: form F of the facet face, area size S of the facet face, spacing H of the centroid of the facet faces from the base plane, position P of the centroid of the facet face in the coordinate system spanned by the x-axis and the y-axis, angle of inclination Ax of the facet face about the x-axis towards the base plane, angle of inclination Ay of the facet face about the y-axis towards the base plane and azimuthal angle Az of the facet face defined by the angle of rotation of the facet face about the z-axis. Furthermore, in the area 31 one or more of the parameters F, S, H, P, Ax, Ay and Az of the facet faces 50 arranged in this area are varied pseudorandomly within a variation range predefined for the area 31. One or more of the above-named parameters are thus varied pseudorandomly in the case of each of the facet faces 50 arranged in the area 31.

It is particularly advantageous here if the parameters F, S, H, P, Ax, Ay and Az for each of the facet faces 50 are fixed as described below:

First, the parameters for each facet face are fixed according to a predefined function which brings about a predefined optical effect, for example an optically variable representation of a given item of information. Then, one or more of the parameters F, S, H, P, Ax, Ay and Az thus predefined by this function are varied pseudorandomly within a predefined variation range for each of the facet faces 50, whereby for example the range of the angle of view, the robustness or the depth impression of the effect fixed by the function are improved and for example gloss and glitter effects are added. The parameters F, S, H, P, Ax. Ay, Az are thus determined for each of the facet faces 50 in the area 31 by an additive or multiplicative superimposition of the parameters predefined by the predefined function for the respective facet face with a pseudorandom variation of one or more of these parameters within a variation range predefined for the respective parameter in the area 31.

Furthermore, it is also possible here for still further facet faces which do not have the above-specified dimensions and/or are varied pseudorandomly, not randomly, in one of their parameters to be provided in the area 31 in addition to the facet faces 50.

In the areas 32, in the same way as described above with regard to the area 31, a large number of facet faces 50 are moulded into the surface 232 of the layer 23 and one or more of the parameters F, S, H, P, Ax, Ay, Az are varied pseudorandomly. It is particularly advantageous here if in the second area the parameters F, S, H, P, Ax, Ay, Az are likewise predefined by a predefined function and this predefined parameter is then superimposed additively with the pseudorandom variation of one or more of these parameters. It is advantageous here if the predefined function of the area 31 differs from the predefined function of the areas 32, whereby the generation of different optically variable effects in the areas 31 or 32 is brought about. Furthermore, it is particularly advantageous if the parameters which are varied pseudorandomly in the area 31 on the one hand and in the area 32 on the other hand differ. An interesting different optical appearance of the areas 31 and 32 can also be achieved thereby. For example, the facet faces can be arranged in area 31 by means of a function in the form of a convex lens and in area 32 by means of a flat function or else by means of a function in the form of a concave lens. Furthermore, it is advantageous if at least one of the variation ranges of the varied parameters is chosen differently in the area 31 and in the area 32 and here the different variation ranges differ in particular by at least 20%, further preferably at least 50%. An interesting different optical appearance of the areas 31 and 32 is also achievable hereby.

In the areas 33 to 35, diffractive relief structures or isotropic or anisotropic matte structures which in each case display a different optically variable effect are preferably moulded into the surface 232 of the layer 23. The relief structures moulded in these areas are formed for example by diffraction gratings with a spatial frequency of between 700 lines/mm to 5000 lines/mm, computer-generated holograms, 2D or 3D holograms, or a Kinegram®. Furthermore, it is also possible to mould a zero-order diffraction structure as relief structure in one of the areas 33 to 35.

The zero-order diffraction structure is preferably a relief structure with a spacing between the individual structural elements in the range of light wavelengths to half of a light wavelength for a wavelength in the visible wavelength range (approx. 350 nm to 800 nm), which is preferably provided with a high refraction index dielectric reflective layer (HRI layer), to generate a typical colour effect dependent on the angle of view when the security element is tilted and/or rotated.

The protection against forgery of the security element 10 is significantly increased by the contrasting optical appearance of the areas 31 to 35 brought about in this way.

After moulding of the relief structures 41 to 43 into the surface 232 of the layer 23, the layer 24 is applied to the surface 232.

The layer 24 here preferably comprises a thin-film layer system, such as shown in FIG. 3b. The layer 24 thus has for example a semi-transparent absorption layer 241, spacer layer 242 and a metallic reflective layer 243. The absorption layer 241 is preferably a very thin and thus semi-transparent metal layer, for example a layer of chromium with a layer thickness of 5 nm. The spacer layer 242 is a layer of a transparent dielectric, for example $MgF_2$, $SiO_2$ or polymer. The layer thickness of the spacer layer 242 here is preferably chosen such that for a defined angle of view it satisfies the $\lambda/2$ or $\lambda/4$ condition for $\lambda$ in the range of the wavelength of visible light, i.e. the optical thickness of the layer 242 is in the range of half or quarter of the light wavelengths and thus, with the interference of the light reflected back by the boundary surface between the absorption layer 241 and the spacer layer 242 on the one hand and the boundary surface between the spacer layer 242 and the reflective layer 243 on the other hand, a colour-shift effect dependent on the angle of view is generated in the range of light visible for the human eye.

The layer 243 is preferably a largely opaque metal layer, for example a layer of aluminium with a layer thickness of 30 nm.

Investigations have shown that particularly interesting optically variable effects can be achieved by coating the facet faces 50 with a thin-film layer system.

However, it is also possible for a reflective metal layer, for example of Al, or an HRI layer (HRI=High Refraction Index), for example ZnS or $TiO_2$, to be applied as layer 24. Furthermore, it is also possible for the reflective layer 24 not to be applied over the whole surface of the complete surface 232 of the layer 23, but to be applied to the layer 232 only partially and/or in a pattern. Thus, it is possible for example to apply the layer 24 only in the areas 31 to 35 and not in the surrounding area 30.

Furthermore it is also possible for the layer 24 to also be applied not over the whole surface in the areas 31 to 34, but to be applied in a pattern in order to thus encode for example an item of information visible in transmission.

Figure 3D:
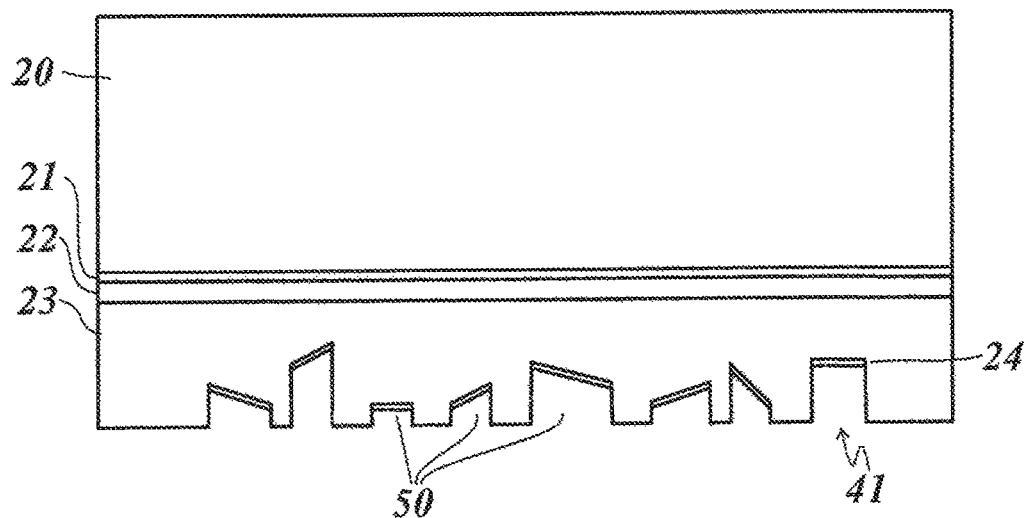

FIG. 3d shows an example in which, in the area 31, a metallic reflective layer, e.g. of aluminium or copper, is provided as layer 24 only in the partial sections of the area 31 overlaid with the facet faces 50, but is not provided in the partial sections of the area 31 not overlaid with the facet faces. Such a partial formation of the layer 24 is also possible with the structure of the layer 24 according to FIG. 3b.

According to a preferred embodiment example of the invention, it is furthermore possible for different layers 24 to be applied to the surface 232 of the layer 23 in the areas 31, 32, 33, 34 and/or 35, thus for example a thin-film layer system is applied in the area 31, a metallic reflective layer is applied in the areas 32 and an HRI layer is applied as reflective layer in the areas 33 to 35. It is also conceivable to apply a metallic reflective layer, e.g. aluminium, in the areas 33 to 35, and another metallic reflective layer, e.g. copper, in the areas 31 and 32. This makes it possible to combine the optical effects of the facet faces with the different colour impressions of the two metallic reflective layers.

Furthermore, it is also possible for the layer 24 to have, in the area 31 and/or in the area 32, partial sections in which the layer 24 is constructed differently, or is formed by different layers or different combinations of layers.

Figure 3E:
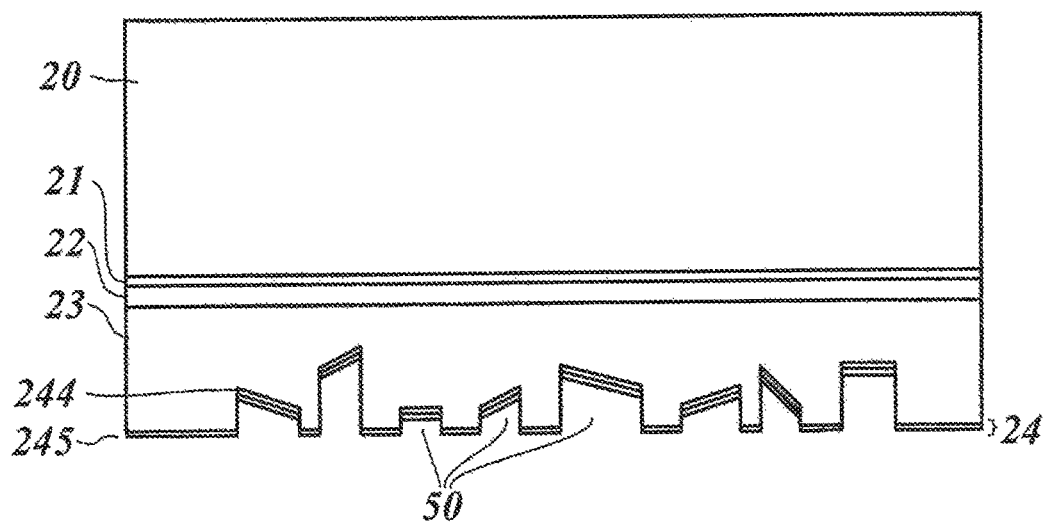

FIG. 3e shows an example in which a metallic reflective layer 244, e.g. aluminium, is provided in the areas 31 and 32 only on the facet faces 50. Furthermore, an additional further, preferably transparent or translucent, reflective layer 245, for example of an HRI material such as for example ZnS or $TiO_2$, is applied to the total surface of the multi-layer body, i.e. in the areas 31, 32 as well as 33, 34 and 35 as well as in particular also to the facet faces 50 and adjacent to the facet faces 50.

Furthermore, it is also possible for a reflective layer 24 which is constructed differently in partial sections of the areas 31 and 32 to be applied inside the areas 31 and 32, or for only the facet faces and not the areas of the surface 232 surrounding the facet faces to be provided with the reflective layer 24 there.

The adhesive layer 25 is then applied to the layer 24, as shown in FIG. 3b.

For the application of the security element 10 to the carrier substrate 11, the transfer film is applied according to FIG. 3b to the carrier substrate 10, the adhesive layer 25 is activated for example by heat and pressure and then the carrier film 20 is removed, with the result that a multi-layer body with the layer structure shown in FIG. 2b remains on the carrier substrate 11.

Furthermore, it is naturally also possible for the security element 10 to comprise, in addition to the layer shown in FIG. 2b, also one or more further layers, for example another one or more further decoration layers, reflective layers, layers of a magnetic material, etc. Thus, it is possible for the security element 10 to be formed as a laminating film and, instead of the protective layer 22, for a carrier film to be provided which is preferably bonded to the layer 23 with an adhesion promoter layer.

A further embodiment is explained below with reference to FIG. 2g: as represented schematically in FIG. 2g, a first optical effect, e.g. "rolling bar" effect, is produced with the facet faces 50 and this is combined with a demetallization in areas of the surface of a partial section 312 of the first area without facet faces 50 for the local removal of the, in particular metallic and opaque, reflective layer (in the form of a figure "50").

Figure 2G:
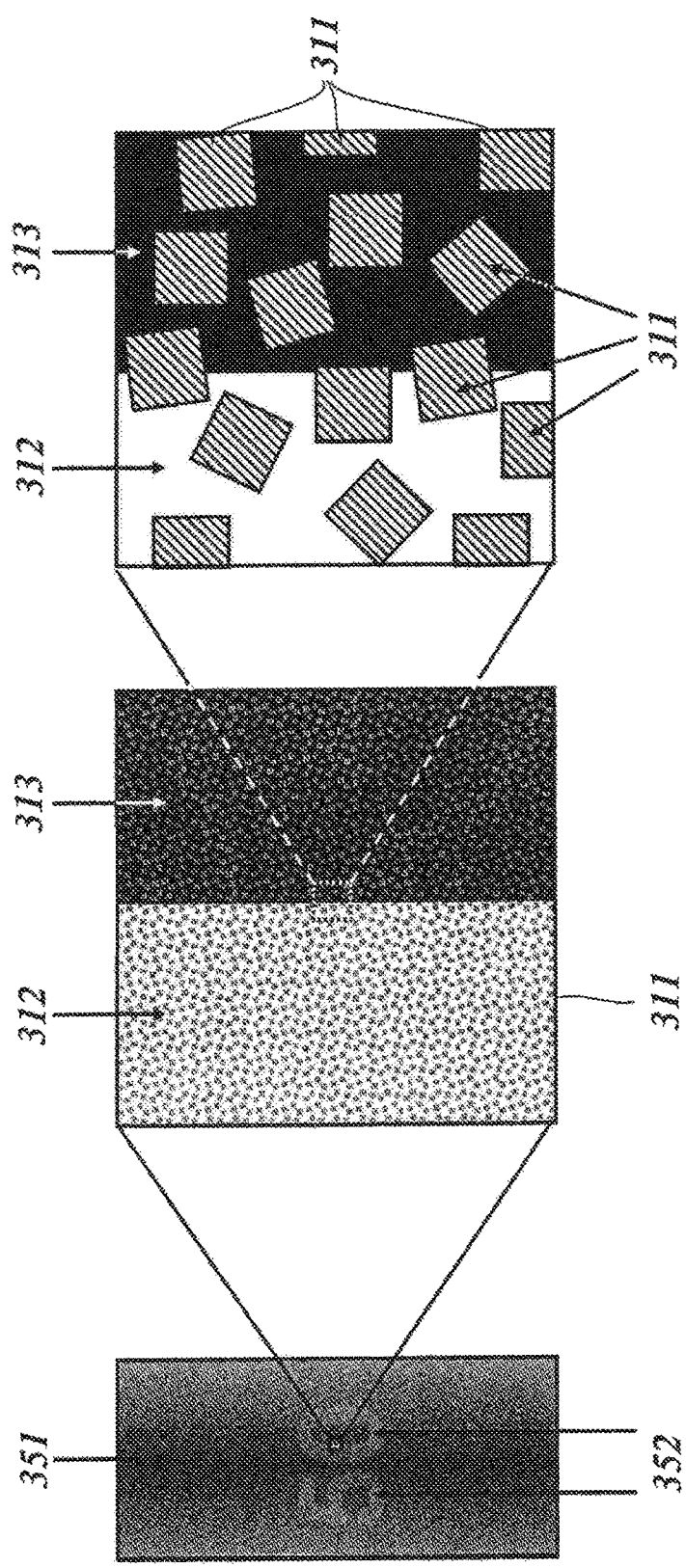
FIG. 2g shows a schematic representation of the top view of a security element at different levels of magnification.

As shown in FIG. 2g, the area 31 thus has a large number of partial sections 311 which in each case are formed by the surface overlaid by a facet face and which are overlaid with a reflective layer, preferably a metallic reflective layer. Furthermore, the background area for the partial surfaces 311 is divided into a first partial section 313 and a second partial section 312. The first partial section 313 is likewise overlaid with the reflective layer, in particular overlaid with the metallic reflective layer. The second partial section 312 is not overlaid with the reflective layer, preferably demetallized. In the area of the "50" the partial sections 311 are thus surrounded by the partial sections 312 and outside of the "50" are surrounded by the partial section 313.

Thus, such a multi-layer body has a first optical effect 351 in reflection and a second optical effect 352 in transmission. In reflection, the "rolling bar" effect appears as first optical effect with full intensity over the whole area, as all facet faces are provided with the reflective layer. If the multi-layer body is now integrated for example into a window, the figure "50" is additionally shown as second optical effect 352 when viewed in transmission, as the metallic reflective layer removed in areas acts as a shadow mask.

The demetallization for removal of the metallic reflective layer here can be carried out for example with the help of the previously described demetallization structures or by means of known etching processes or washing processes for the local removal of metal layers.

A "rolling bar" effect is an optical effect similar to a reflective cylinder lens. In the process the areas of the cylinder lens which reflect the light in the direction of an observer appear brighter than the areas which reflect the light in other directions. Thus, this function produces a kind of "light band" which appears to move over the cylinder lens when the multi-layer body is tilted in the direction of the angle of view.

Figure 4:
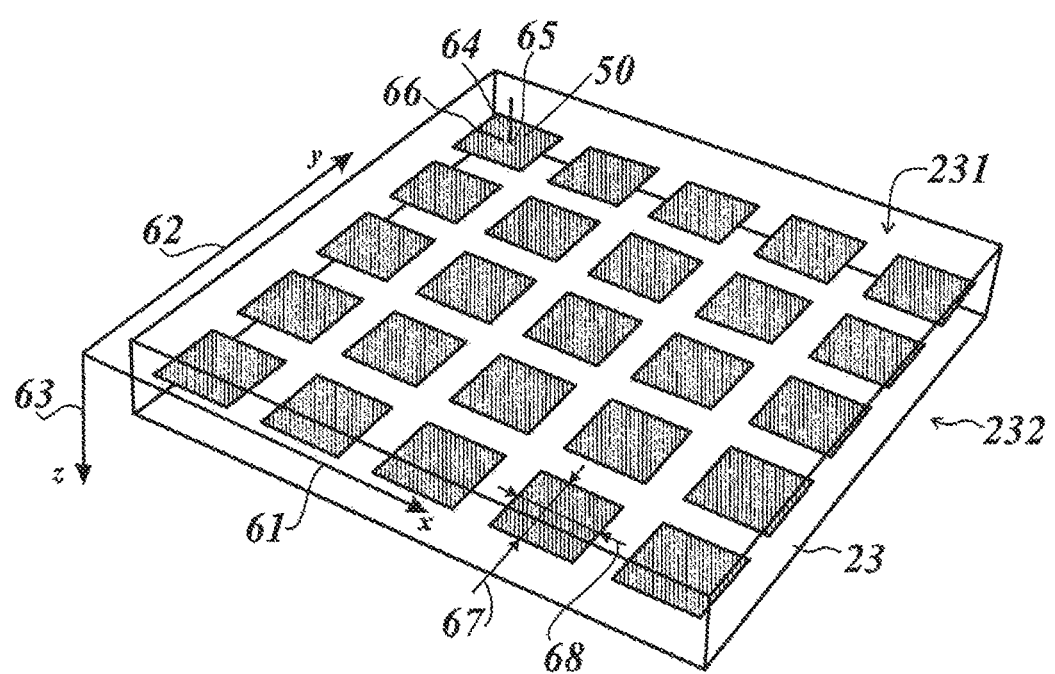
FIG. 4 shows a schematic representation of a layer with several moulded facet faces.
Figure 5A:
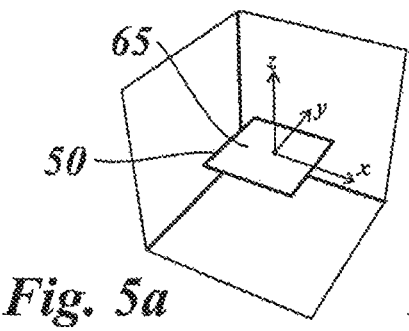
FIG. 5a-FIG. 5d show schematic representations to illustrate the variation of parameters of a facet face.
Figure 5B:
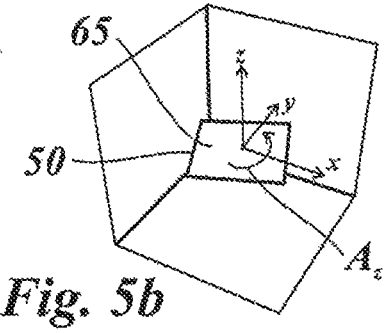
Figure 5C:
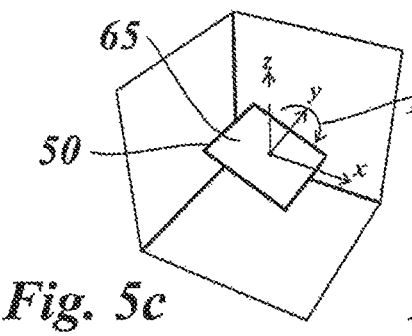
Figure 5D:
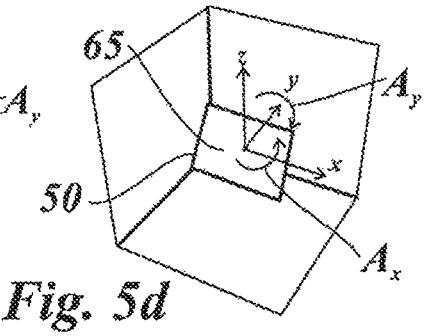

The parameters of the facet faces 50 are preferably fixed in the area 31 according to one of the processes described below:

FIG. 4 illustrates a model of the layer 23 in the area 31 with the upper surface 231 and a large number of facet faces 50 moulded into the lower surface 232. A coordinate system with the coordinate axes x, y and z which defines the associated spatial directions 61, 62 and 63 is fixed by the upper surface 231 of the layer 232. As shown in FIG. 4, the facet faces 50 are arranged according to a regular 2-dimensional grid which is spanned by the x- and y-axes of the coordinate system. This grid defines a normal position 65 in the base plane spanned by the x-axis and the y-axis for each centroid 66 of the facet faces 50. The grid width of the grid in the direction 61 and the direction 62 here is preferably chosen constant. Furthermore, it is also preferred that the grid width of the grid is the same in the direction 61 and the direction 62. The function determining the parameters F, S, H, P, Ax, Ay and Az of the facet faces is in each case a constant in FIG. 4.

The facet faces each have a width 67 and a length 68, wherein by width is generally meant the minimum dimension of two opposite boundary points of a facet face and by length is meant the maximum dimension between two boundary points of a facet face. The facet faces can have any shape, for example the form of a square, a rectangle, a regular polygon, a random polygon, a circle or a conic section. The use of facet faces with a form F in the shape of a circle or conic section has proved particularly advantageous here.

Furthermore, it is advantageous to use the form of the facet faces 50 as a concealed security feature. Thus, it is possible for example to choose the facet faces 50 in the form of letters or symbols, for example the outline of a country, a characteristic mountain or lake, or combinations or superimpositions thereof.

The surface of the facet face 50 is preferably formed flat in the embodiment shown in FIG. 4.

In the representation according to FIG. 4, the facet faces 50 all have the same form F and area size S. However, it is also possible for the area size S and/or form F of the facet faces 50 to be varied in the area 31, for example to be varied randomly or to differ from facet face to facet face according to the predefined function in order to thus generate a specific item of optical information, for example a grey-scale image, for example by variation of the area size S.

The same applies to the spacing 64 of the centroid 65 of the facet faces 50 from the base plane fixed by the x-axis and the y-axis. This can also be predefined by the predefined function for generating a given item of optical information, be varied pseudorandomly or be fixed by an additive shift of the value provided according to the predefined function with a pseudorandom variation of the parameter.

Further possible variations of the parameters of the facet faces 50 are explained with reference to the following FIG. 5a to FIG. 6d.

FIG. 5a to FIG. 5d each show the spatial arrangement of a facet face 50 with the centroid 65. In the representation according to FIG. 5b, the facet face 50 is rotated from the starting position shown in FIG. 5a about the z-axis perpendicular to the base plane and thus the azimuthal angle Az of the facet face 50 is altered. In the representation according to FIG. 5c, the facet face 50 is tilted about the y-axis vis-à-vis the starting position shown in FIG. 5a and thus the angle of inclination Ay of the facet face about the x-axis towards the base plane changes. In the representation according to FIG. 5d, the facet face 50 is tilted vis-à-vis the starting position according to FIG. 5a both about the x-axis and about the y-axis and thus both the angle of inclination Ax of the facet face 50 about the x-axis towards the base plane and the angle of inclination Ay of the facet face about the y-axis towards the base plane are changed.

Figure 6A:
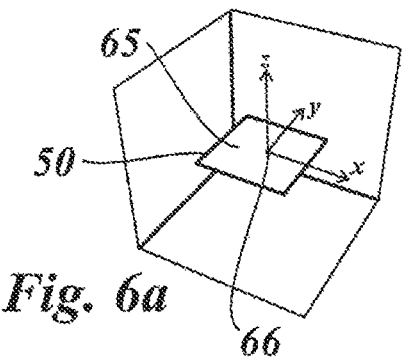
FIG. 6a-FIG. 6d show schematic representations to illustrate the variation of parameters of a facet face.
Figure 6B:
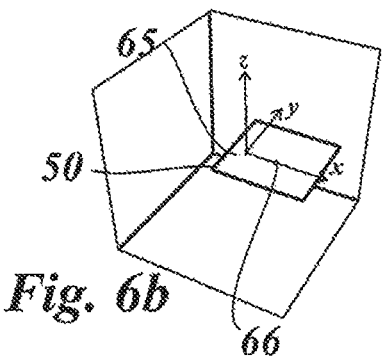
Figure 6C:
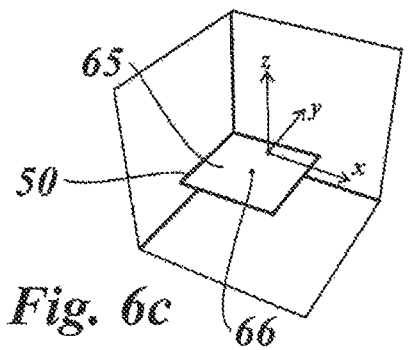
Figure 6D:
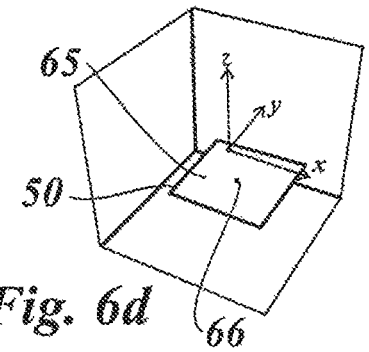

FIG. 6a shows the facet face 50 in a starting position in which the centroid 66 of the facet face 50 matches the normal position 65 of the facet face fixed by the grid. In the representation according to FIG. 6b, the position of the facet face 50 in the base plane spanned by the x- and y-axis is varied to the extent that the centroid is shifted in the direction of the x-axis vis-à-vis the normal position 65. FIG. 6c shows a corresponding representation in which the centroid of the facet face 50 is shifted in the direction of the y-axis vis-à-vis the normal position 65. FIG. 6d shows a representation in which the centroid 66 of the facet face 50 is shifted both in the direction of the x-axis and in the direction of the y-axis from the normal position 65.

Figure 7A:
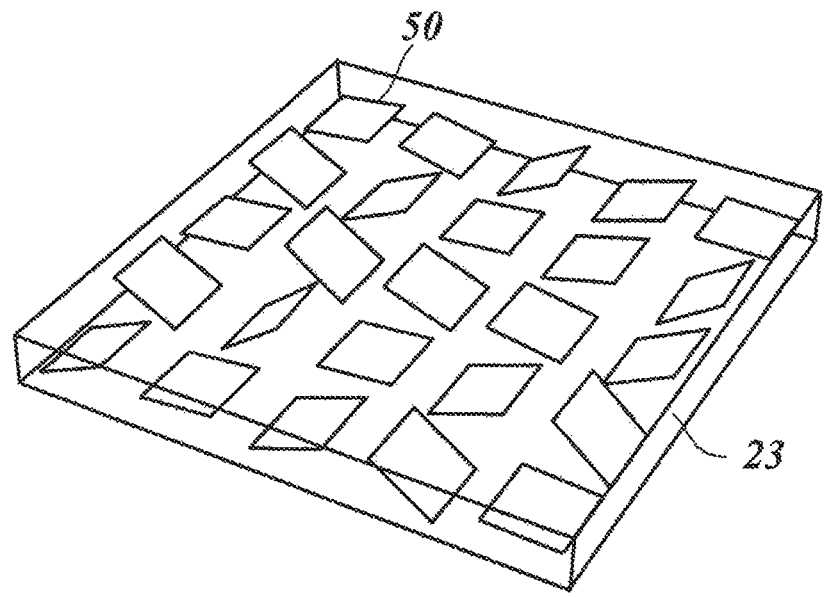
FIG. 7a-FIG. 7e show schematic representations of a layer with several moulded facet faces in which one or more parameters are varied pseudorandomly.
Figure 7B:
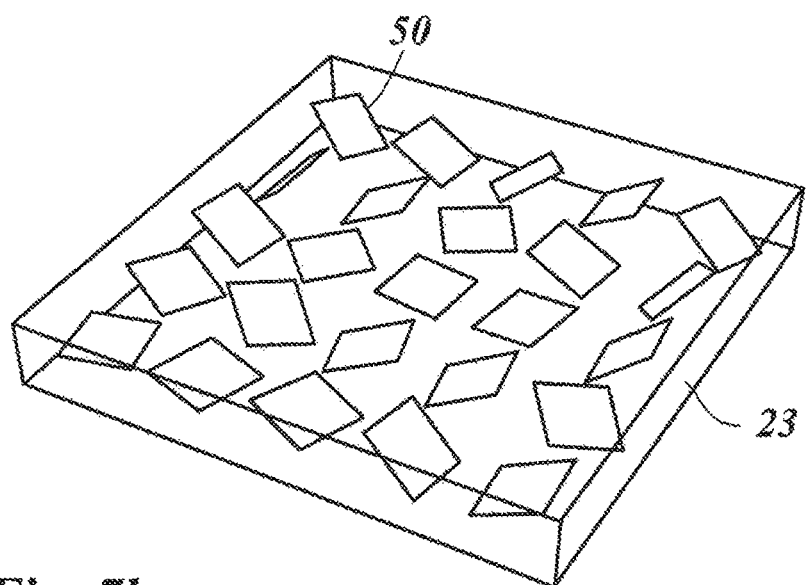

FIG. 7a now shows an embodiment in which the angle of inclination Ay of the facet faces 50 in the area shown is varied pseudorandomly in a variation range of from −45° to +45° and the representation according to FIG. 7b shows an embodiment in which both the angle of inclination Ax and the angle of inclination Ay are varied in a variation range of between −45° and +45°. A matte gloss and a glitter effect are in particular generated by this pseudorandom variation, wherein the range of the angle of view in which these effects are visible is larger in the embodiment example according to FIG. 7b than in that according to FIG. 7a.

Figure 7C:
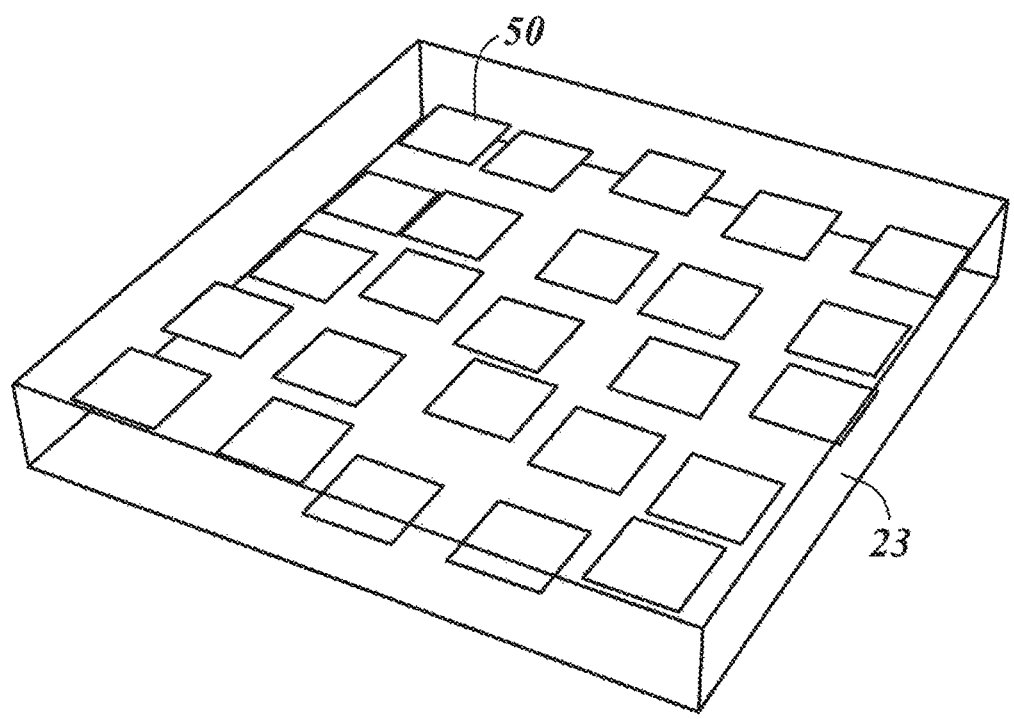

FIG. 7c shows an embodiment in which the positions P of the centroids of the facet face 50 in the coordinate system spanned by the x-axis and the y-axis are varied pseudorandomly. Here, in the area represented, the position P of each of the facet faces 50 is varied by a pseudorandom shift in the direction of the x-axis as well as by a pseudorandom shift in the direction of the y-axis from the respective normal position 65, as has already been explained above with reference to FIG. 6d.

If for example the grid width of the grid is chosen such that the grid width in x-direction corresponds to 1½ times the dimension of the facet face 50 in x-direction and the grid width in y-direction corresponds to 1½ times the dimension; of the facet face 50 in y-direction, the variation range of the random shift in x-direction is preferably chosen between −Dx/2 and +Dx/2 and the variation range of the random shift in y-direction is chosen between −Dy/2 and +Dy/2, wherein Dx is the dimension 68 of the facet face 50 in x-direction and Dy is the dimension 67 of the facet face in the direction of the y-axis.

Investigations show that the optical brilliance of the optically variable effect is further also improved by the pseudorandom variation of the position P. Furthermore, the formation of ghost images, unintended, e.g. diffractive, colour phenomena and the like can also be avoided.

Figure 7D:
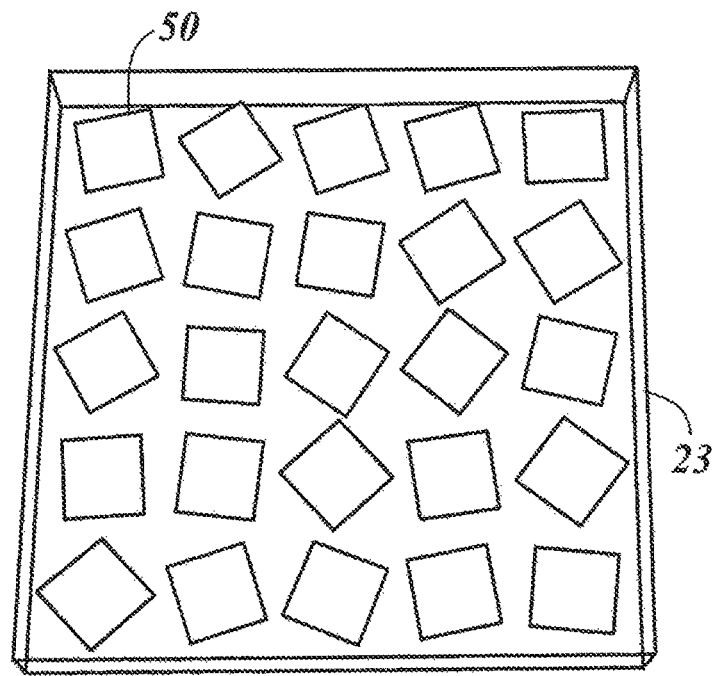

FIG. 7D shows an embodiment in which the azimuthal angle Az of the facet faces 50 is varied pseudorandomly. The variation range of the azimuthal angle Az here is preferably chosen between −45° and +45°.

Figure 7E:
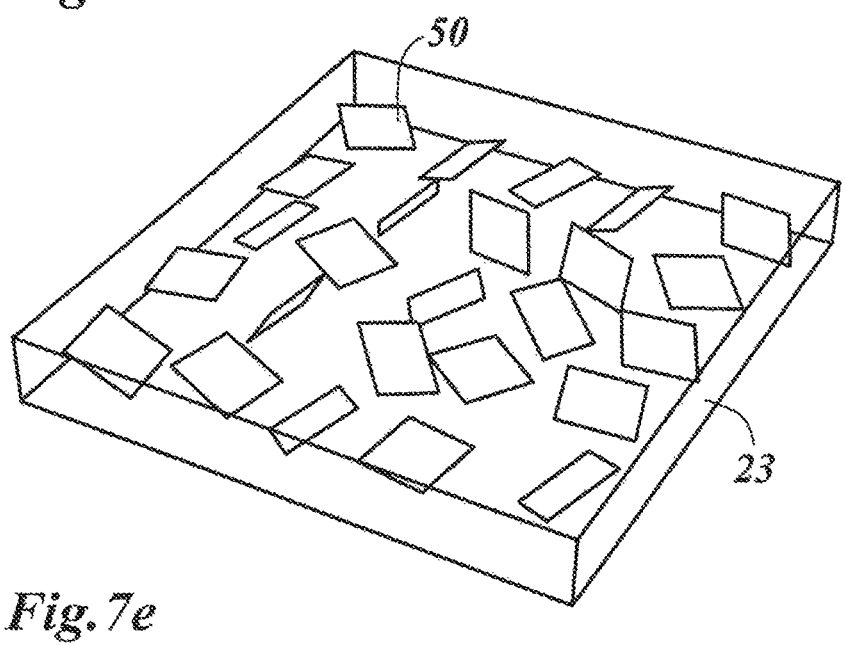

FIG. 7e shows an embodiment in which the parameters P, Ax, Ay and Az are varied pseudorandomly in the area represented.

As already stated above, the parameters of the facet faces 50 are preferably determined by an additive or multiplicative superimposition of the values for the respective parameters according to a predefined function which defines an optically variable effect to be achieved, with a pseudorandom variation of one or more of the parameters within the predefined variation range. Preferably, the procedure for this is as follows:

First the position P of the facet face 50 is ascertained, i.e. the x-, y-position of the centroid of the facet face is determined. Then the local normal of the predefined function at this point x, y is ascertained and adopted as the normal of the facet face 50 in this point and thus the angles of inclination Ax and Ay of the facet faces are fixed. The gradient of the function in this point x, y is then used in order to determine the orientation of the facet faces and thus the azimuthal angle of the facet faces Az in the point x, y. The remaining parameters are preferably set to constant values by the function. As already set out above, it is also advantageous here that the parameter S is varied to generate a grey-scale image. The thus-fixed parameters of these facet faces 50 are then superimposed additively with the pseudorandom variation of one or more of the parameters of the facet faces, as already set out above. Thus, for example, the position P is varied pseudorandomly as shown in FIG. 7a and the angles of inclination Ax and Ay, as shown in FIG. 7b, are varied pseudorandomly.

Thus, for example, a function F(x,y) which contains a predefined item of optical information, in particular a predefined optically variable item of information, is first predefined. For each of the normal positions in the grid spanned by the x-axis and y-axis according to FIG. 4, in which the function (x,y) is a constant and the normal vector is always parallel to the z-axis, now at least the angle of inclination Ax and Ay of the facet face allocated to the respective normal position is calculated in the area 31 as set out above. In addition to the angles of inclination Ax and Ay, optionally the azimuthal angle Az, the spacing H of the centroid from the base plane and the area size S of the respective facet faces, and optionally also the form F of the facet faces, can also be determined individually by the function F(x,y). The spacing H can thus be determined for example from the spacing of the respective point from a reference surface (optionally also accompanied by additional combination with a modulo function) and the area size S determined by a brightness value allocated to the respective point. Then the position of the respective facet faces is optionally varied pseudorandomly as set out above and then the corresponding calculations are carried out for the next facet face 50.

Figure 8E:
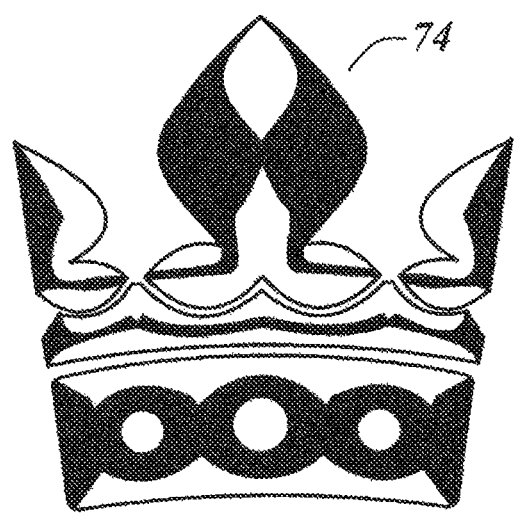
FIG. 8e shows a schematic top view of a free-form surface in the form of a cut section of a three-dimensional object.

FIG. 8a to FIG. 8e now illustrate by way of example several such predefined functions F(x,y), wherein by such a function, as shown in the example of FIG. 8d, is also meant a function defined according to a cylindrical coordinate system.

The function F(x,y) illustrated with reference to FIG. 8a generates an optical "rolling bar" effect similar to a reflective cylinder lens. In the process, the areas of the cylinder lens which reflect the light in the direction of an observer appear brighter than the areas which reflect the light in other directions. Thus, this function produces a kind of "light band" which appears to move over the cylinder lens when the multi-layer body is tilted in the direction of the angle of view. The function F(x,y) illustrated with reference to FIG. 8b generates an optically variable effect similar to a reflective spherical lens. The function F(x,y) illustrated with reference to FIG. 8c generates a distortion effect resulting from the convex and concave reflective surfaces. The function F(x,y) described in FIG. 8d and illustrated there with reference to a cylindrical coordinate system generates a radial expansion movement effect.

The function F(x,y) thus preferably describes the form of a three-dimensional free-form surface, for example the surfaces 70 to 74 shown in FIG. 8a to FIG. 8e. As already set out above, the angles of inclination Ax and/or Ay here are determined by the respective surface normal of this three-dimensional free-form surface in the centroid of the respective facet face.

It is further possible for the function F(x,y) to be based on a logo, an image, an alphanumeric character, a geometric figure or another object or for the function F(x,y) to describe the cut section of a surface of a three-dimensional object. This is shown for example in FIG. 8e. FIG. 8e thus shows the representation of a free-form surface determined by a predefined function F(x,y) in the form of a three-dimensionally designed crown.

Here, the three-dimensional free-form surface can preferably also be defined in that a given two-dimensional logo, image or letter is taken as a starting point, and a free-form surface is defined rising, lens-like, from the outlines of such a two-dimensional object, i.e. similar to the curvature of a continuously curved optical lens, relative to the respective centroid, which free-form surface preferably follows the outline of the two-dimensional starting object and—because of the lens-shaped elevation—displays a lens-like magnification, demagnification or distortion effect. This is also achieved for example in that a three-dimensional surface providing a lens function, e.g. the surface 71, is geometrically transformed according to the two-dimensional outlines.

It is particularly advantageous here if the free-form surface, as shown in FIG. 8a-FIG. 8d, is formed by a continuous and differentiable function and is composed of flat and curved areas of surface. The maxima of the free-form surface in the direction of the z-axis are at a distance from each other, with respect to their respective projection onto the base plane, of preferably between 4 mm and 40 mm, further preferably between 8 mm and 20 mm.

The free-form surface here can comprise one or more free-form elements which in each case have been determined for example as set out above from a two-dimensional object or the scanning of a cut section of a surface of a three-dimensional object. The minimum dimension of each of these free-form elements is preferably between 2 mm and 40 mm, further preferably between 4 mm and 20 mm.

FIG. 9a to FIG. 9d illustrate the performance of the steps for determining the parameters of the facet faces 50 with reference to a predefined function F(x,y) which describes a parabolic free-form surface according to FIG. 8a, which generates a "rolling bar" effect as an optically variable item of information (with corresponding design of the free-form surface with reflective layer for viewing in reflection/incident light).

Figure 9A:
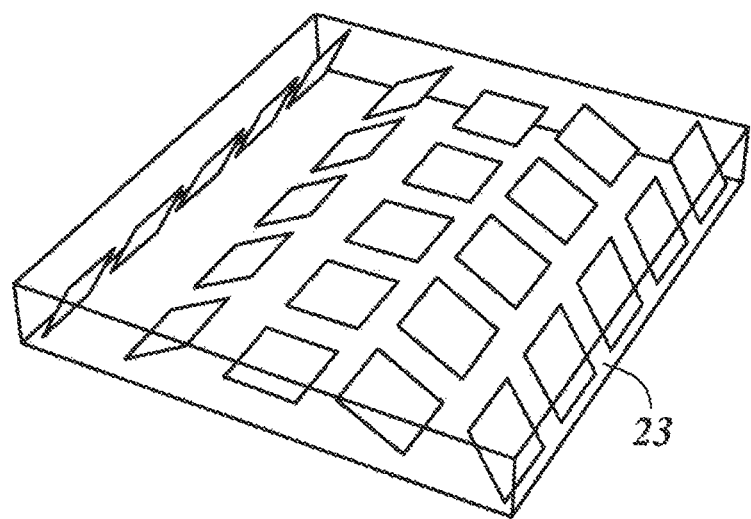
FIGS. 9a-9d show schematic representations of a layer with several moulded facet faces the angles of inclination of which are also determined by a function describing an item of optical information.

In a first step, the facet faces 50 are positioned in their respective normal position and the angles of inclination Ax and Ay of the respective facet faces are determined corresponding to the surface normal of the three-dimensional free-form surfaces described by the function F(x,y) in the respective centroid of the facet faces 50, as shown in FIG. 9a.

Figure 9B:
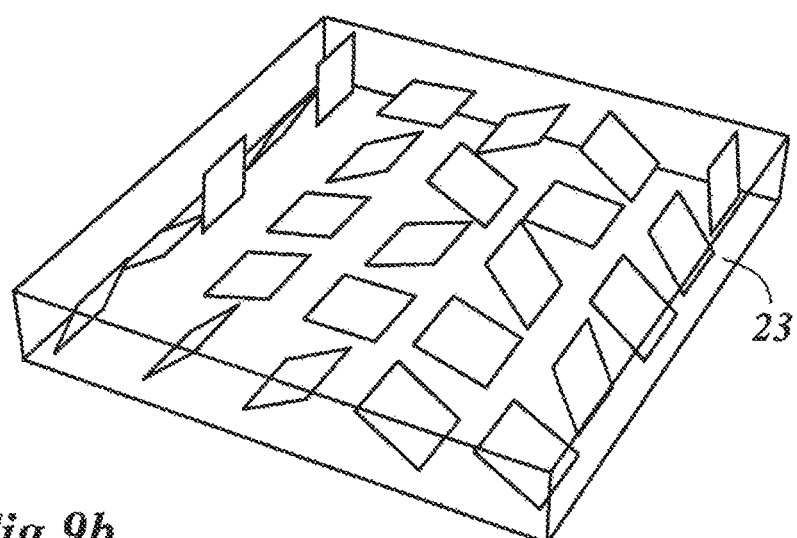

In a next step, the angle of inclination Ay is superimposed with a pseudorandom variation of the angle of inclination Ay, as shown in FIG. 9b. The variation range of this pseudorandom variation here is preferably chosen between 20% and 80% of the average gradient of the function F(x,y).

Figure 9C:
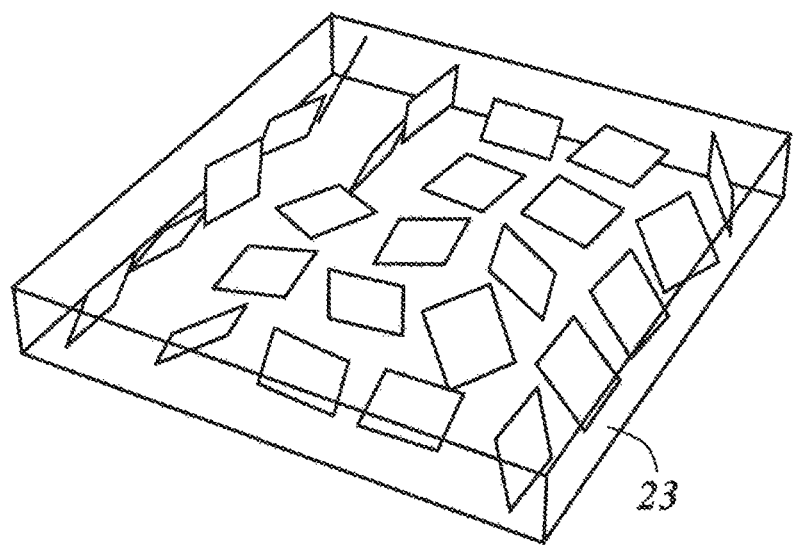

Then, the azimuthal angle Az of the facet faces is varied pseudorandomly, as shown in FIG. 9c.

Figure 9D:
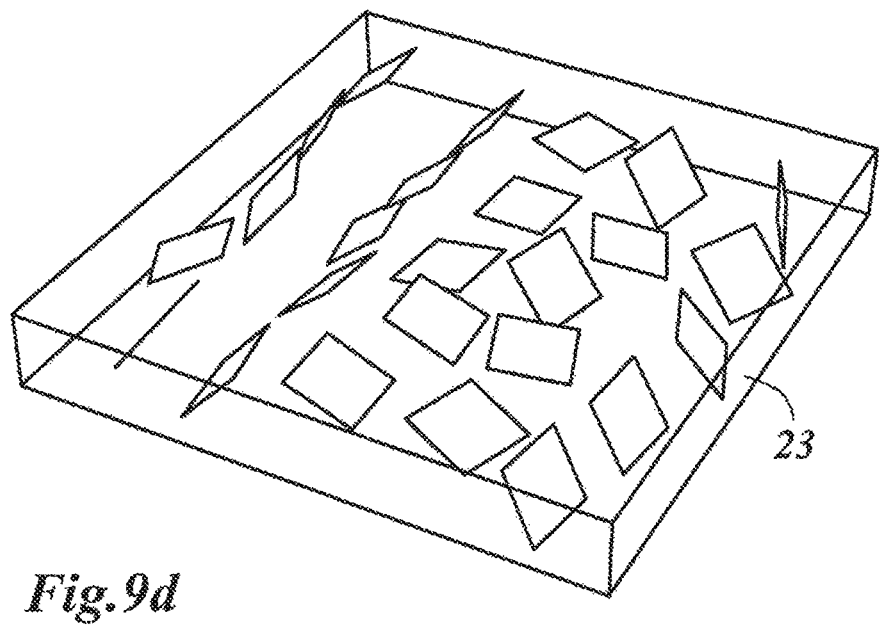

Then, the position P of the facet faces is varied pseudorandomly by a pseudorandom shift from the respective normal position, as shown in FIG. 9d.

An optically variable "rolling bar" effect is hereby achieved in which the line represented has further gloss, matte gloss and glitter effects and the optically variable effect is visible in a broader range of the angle of view and thus robustly, i.e. under a wide variety of viewing and illumination conditions.

FIG. 10a to FIG. 10c show photographs of the area 31 from different viewing angles, with a corresponding choice of the function F(x,y) as spherical lens according to FIG. 8b.

The embodiment examples represented above have a fill factor, a ratio of the area of the area 31 covered by facet faces to the total area of the area 32, which is between 80% and 50%. The optically variable impression is thus advantageously also superimposed in a given viewing area with an optical impression which is formed by the areas of the area 31 not overlaid with facet faces. In order to arrive at high overlaying densities of facet faces, it may be necessary to incorporate correction steps in the master structure during the generation of the arrangement of the facet faces. For example, after a first run for the arrangement of the facet faces, the algorithm can provide a searching step which searches for randomly formed surfaces which have no facet faces but would be large enough to hold facet faces. The algorithm can then place, in particular fit, further facet faces into these surfaces.

Furthermore, it is also advantageous to choose the fill factor such that the areas not overlaid with facet faces do not make a higher contribution to the overall optical impression than the remaining orientations of the facet faces 50.

To increase the fill factor, for this the spacing of the facet faces relative to each other can be reduced for one thing, or a superimposition of facet faces can be allowed. Preferably, for this the grid width of the grid is chosen between 0.8 times and 1.5 times the dimension of the facet faces in the respective direction.

Furthermore, it is also advantageous to reduce the number of parameter variation values of the angles of inclination Ax and Ay for this.

Furthermore, it is possible for the surfaces of the facet faces to also be overlaid with one of the following structures over the whole surface or over part of the surface:

Matte structures which contribute to scattering the light and increasing the range of the angle of view. These matte structures can scatter the light isotropically or anisotropically. The anisotropic matte structures can be aligned identically on all facet faces and in this case scatter the light in approximately the same solid angle range.

Figure 11A:
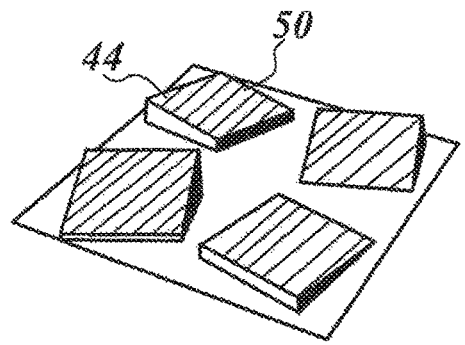
FIG. 11a and FIG. 11b each show a schematic representation of a cut section of a multi-layer body with several facet faces which are overlaid with a diffraction grating.
Figure 11B:
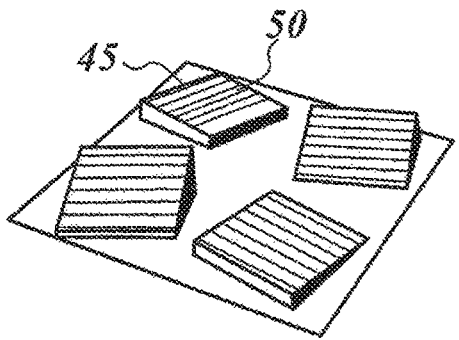

Diffractive structures, for example sinusoidal, rectangular or sawtooth-shaped gratings. The gratings can be linear, crossed or hexagonal. Preferably, these diffractive structures have grating periods in the range of from 200 nm to 2000 nm. Furthermore, the structure depth is preferably in the range of from 20 nm to 2000 nm. As shown in FIG. 11a, these diffraction gratings can be provided over the whole surface of the respective facet face. Furthermore, the grating lines of all facet faces can be aligned parallel to each other, independently of the orientation of the facet faces. However, it is also possible, as shown in FIG. 11b, for the azimuthal angle of the diffractive gratings to be oriented in the direction of the azimuthal angle of the respective facet face 50. Diffractive structures, e.g. a diffractive line grating, arranged in particular in a pattern, with 500 to 5000 lines/mm, can for example also serve to align the molecules of a liquid crystal layer on the diffractive structure to set the polarization properties of the liquid crystal material.

Moth-eye structures reduce the reflection at the boundary surface between the facets and the surrounding medium. There are also other structures which produce this effect, for example linear subwavelength gratings with a period of preferably <200 nm. All of these types of structures can be used to set the brightness of the area with the facet structures in targeted manner. It is also conceivable to mix or combine facet faces with moth-eye structures with facet faces without structures or with different structures in the area 31.

Zero-order diffraction structures, such as described for example in U.S. Pat. No. 4,484,797 and WO 03/059643 A1. These structures typically have grating periods in the range of from 200 nm to 500 nm and grating depths of between 50 nm and 300 nm. The grating profile can be formed rectangular or sinusoidal, or more complex. These structures are preferably coated with an HRI layer or a multi-layer packet of HRI and LRI layers. The layer thickness of the individual HRI layers is typically in the range of from 30 nm to 300 nm. If the zero-order diffraction structures have a preferred direction, e.g. are linear or crossed, they have a colour shift effect when rotated. The combination of this type of structures with the facet faces makes it possible for example to imitate optical effects such as are produced with pigments with zero-order diffraction structures. The use of our invention makes it possible to be able to avoid the expensive circuitous route of producing, applying and possibly aligning such pigments.

In addition, it is possible to combine a "rolling bar"-type effect with the rotating effect. In a preferred embodiment, linear grating lines of the zero-order diffraction structures are aligned perpendicular to the axis of a "rolling bar" as sketched in FIG. 8a, i.e. in x-direction. If the multi-layer body is now tilted about the y-axis, the zero-order diffraction structures display a small colour tilt effect, such as is known for observation parallel to the grating lines. This has the result that the "rolling bar" effect is dominant. In contrast, when the multi-layer body is rotated by 90°, the colour rotation effect of the zero-order diffraction structures is dominant. If, in contrast, the multi-layer body is tilted about the x-axis, the zero-order diffraction structures display a pronounced colour tilt effect.

Figure 12A:
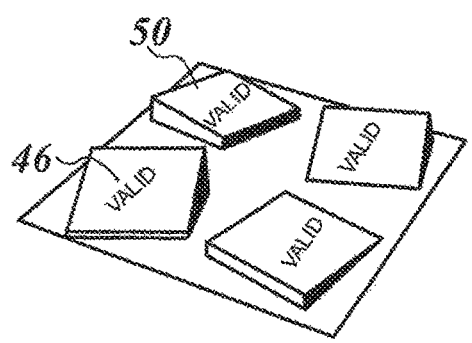
FIG. 12a and FIG. 12b each show a schematic representation of a cut section of a multi-layer body with several facet faces which are overlaid with a nanotext.
Figure 12B:
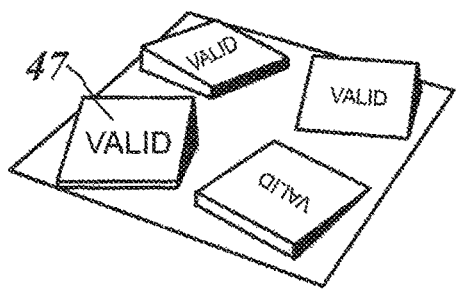

Nanotext, such as shown in FIGS. 12a and 12b. Here too, the nanotext such as shown in FIG. 12a with reference to the nanotext 46 can be arranged independently of the orientation of the facet faces 50 or corresponding to the azimuthal angle of the respective facet face 50, as shown in FIG. 12b.

Nanotext also includes nanomotifs such as logos, outline cards, symbols, images, codes, barcodes and the like.

Figure 13A:
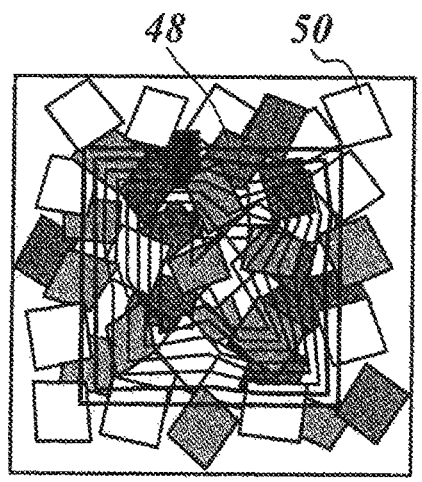
FIG. 13a and FIG. 13b each show a schematic top view of a cut section of a multi-layer body with several facet faces which in each case are overlaid with a diffraction grating.

Such structures can also overlie the facet faces 50 only in a predetermined area, as shown in FIG. 13a. The linear structures 48 overlaid with a diffraction grating here overlie the facet faces 50 in a partial section. In all embodiments of the invention, it is possible for structures such as described further above to be present between the facet faces. These structures can be present only between the facet faces or on and between the facet faces.

Figure 13B:
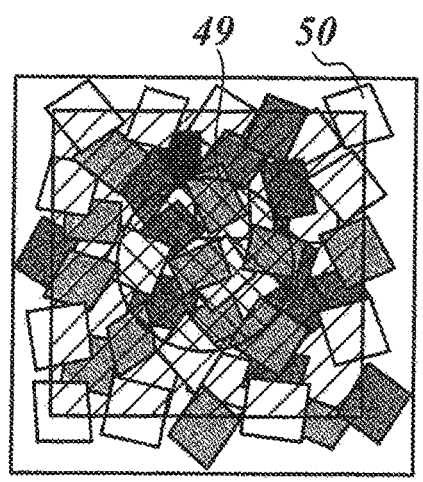

FIG. 13b shows a corresponding embodiment in which the facet faces 50 are superimposed by a zero-order diffraction structure 49 in one area, and thus the colour change generated by these structures, for example from red to green, is generated in the corresponding area with a 90° rotation of the multi-layer body.

The invention claimed is:

1. A multi-layer body with a first layer with a first surface and a second surface opposite the first surface, wherein the first surface of the first layer defines a base plane spanned by coordinate axes x and y, wherein molded into the second surface of the first layer in a first area are a large number of facet faces, wherein each of the facet faces has a minimum dimension of more than 1 μm and a maximum dimension of less than 300 μm, wherein each of the facet faces is determined by the parameters: form F of the facet face, area size S of the facet face, spacing H of the centroid of the facet face from the base plane, position P of the centroid of the facet face in the coordinate system spanned by the x-axis and the y-axis, angle of inclination Ax of the facet face about the x-axis towards the base plane, angle of inclination Ay of the facet face about the y-axis towards the base plane and azimuthal angle Az of the facet face defined by the angle of rotation of the facet face about a z-axis perpendicular to the base plane, wherein one or more of the parameters F, S, H, P, Ax, Ay and Az of the facet faces arranged in the first area is varied pseudorandomly within a variation range predefined in each case for the first area, and wherein a reflective second layer is applied to each of the facet faces, wherein the angles of inclination Ax and Ay of the facet faces in the first area are in each case determined according to an additive superimposition of the angles of inclination Ax and Ay determined by a function F(x,y) with the pseudorandom variation of the angle of inclination Ax and/or the angle of inclination Ay within the respective variation range predefined for the first area of surface, wherein the function F(x,y) is chosen such that it varies the angles of inclination Ax and Ay to generate an optically variable first item of information.

2. A multi-layer body according to claim 1, wherein the predefined variation range of the angles of inclination Ax and/or Ay is chosen between 0.1 times and 1.9 times the average gradient of the function F(x,y).

3. A multi-layer body according to claim 1, wherein the function F(x,y) describes a three-dimensional free-form surface with one or more free-form elements and wherein the angles of inclination Ax and/or Ay determined by the function F(x,y) are determined by the respective surface normal of the three-dimensional free-form surface in the centroid of the respective facet face.

4. A multi-layer body according to claim 3, wherein the function F(x,y) describes a cut section of a surface of a three-dimensional object as free-form element, wherein the minimum dimension of a free-form element relative to a projection onto the base plane is more than 2 mm, and adjacent maxima of the free-form element in the direction of the z-axis relative to a projection onto the base plane are spaced apart from each other by more than 4 mm.

5. A multi-layer body according to claim 3, wherein the three-dimensional free-form surface comprises one or more free-form elements, producing a lens-like magnification, demagnification or distortion effect, in the form of an alphanumeric character, a geometric figure or another object.

6. A multi-layer body according to claim 3, wherein each of the free-form elements has a minimum surface extension in the base plane of between 2 mm and 50 mm and/or wherein that the maxima of the free-form surface relative to its respective projection onto the base layer are spaced apart from each other by more than 4 mm.

7. A multi-layer body according to claim 3, wherein the function F(x,y) is constant and differentiable in the area of each free-form element and/or wherein the function F(x,y) is composed of straight and curved areas of surface in the area of each free-form element.

8. A multi-layer body according to claim 3, wherein the function F(x,y) describes, in the area of a free-form element, a free-form surface in the form of a lens or a lens transformed to represent an alphanumeric character, a geometric figure or another object.

9. A mufti-layer body according to claim 1, wherein for the pseudorandom variation of one or more of the parameters F, H, P, Ax, Ay and Az within the respectively predefined variation range a parameter variation value is selected pseudorandomly from a predefined group of parameter variation values, wherein the group comprises 3 and 10 parameter variation values.

10. A multi-layer body according to claim 1, wherein the angle of inclination Ax and/or Ay of the facet faces in the first area is varied pseudorandomly in a variation range of from −45° to +45 to achieve a glitter effect.

11. A multi-layer body according to claim 1, wherein the azimuthal angle Az of the facet faces in the first area is varied pseudorandomly in a variation range of from −90° to +90°.

12. A multi-layer body according to claim 1, wherein the spacing H of the centroid of the facet faces in the first area is varied pseudorandomly, wherein the difference between the maximum spacing and the minimum spacing between which the spacing H between the facet faces in the first area is varied randomly is between 0.5 μm and 8 μm.

13. A multi-layer body according to claim 1, wherein the facet faces are arranged according to a two-dimensional grid spanned by the x- and the y-axis.

14. A multi-layer body according to claim 1, wherein a two-dimensional grid spanned by the x- and y-axes for each of the facet faces arranged in the first area defines a normal position of the centroid of the respective facet face in the base plane and wherein the position P of each of the facet faces in the first area is determined by a pseudorandom shift from the respective normal position in x- and/or y-direction.

15. A multi-layer body according to claim 14, wherein the limit values of the variation range of the pseudorandom shift from the respective normal position in x-direction and/or y-direction are between 0% and 100% of the dimension of the facet face in the direction of the x-axis or of the y-axis.

16. A multi-layer body according to claim 15, wherein the variation range of the random shift is +D/2 and −D/2, wherein D is the dimension of the facet face in the direction of the x-axis or of the y-axis.

17. A multi-layer body according to claim 14, wherein the grid width of the grid in the direction of the x-axis and/or of the y-axis is 1.5 times the dimension of the facet face in the direction of the x-axis or y-axis.

18. A multi-layer body according to claim 1, wherein the form F of the facet face is selected from the group: square, rectangle, regular polygon, circle, conic section, random polygon.

19. A multi-layer body according to claim 1, wherein two or more of the facet faces in the first area have a different shape.

20. A multi-layer body according to claim 1, wherein one or more of the facet faces have the form of a symbol or a letter in order to provide a second item of optical information concealed from the human eye without the use of a tool.

21. A multi-layer body according to claim 1, wherein one or more of the facet faces are overlaid with a diffractive structure, a zero-order diffraction structure or a nanotext.

22. A multi-layer body according to claim 1, wherein the second layer has a thin-film layer system which has one or more spacer layers the layer thickness of which is chosen such that the thin-film layer system generates, by means of interference of the incident light, a color shift effect dependent on the viewing angle, in the visible wavelength range.

23. A multi-layer body according to claim 1, wherein the second layer comprises an oriented liquid crystal layer.

24. A multi-layer body according to claim 1, wherein the second layer comprises a metal layer and/or an HRI layer.

25. A multi-layer body according to claim 1, wherein the multi-layer body has a second area, wherein one or more of the parameters F, S, H, P, Ax, Ay and Az of each of the facet faces arranged in the second area is varied pseudorandomly in the second area within a variation range predefined in each case for the second area, and in that the parameters which are varied pseudorandomly in the first and in the second area differ, and/or at least one variation range of the varied parameters is chosen differently in the first and in the second area, the at least one variation range in the first area differs from that in the second area by at least 20%.

26. A multi-layer body according to claim 1, wherein the multi-layer body is a transfer film, a laminating film, a packaging film, a security element or a security document.

27. A multi-layer body according to claim 1, wherein in a partial section of the first area which is not overlaid by the facet faces a background structure is molded into the second surface of the first layer, wherein the background structure comprises a diffractive and/or refractive relief structure.

28. A multi-layer body according to claim 27, wherein the background structure comprises a relief structure which produces movement and/or morphing effects as optical effect and/or comprises a microscopic relief structure with diffractive and/or refractive action which acts like a lens.

29. A multi-layer body according to claim 27, wherein the proportion of the surface covered by the areas of surface of the multi-layer body overlaid with the facet faces relative to the total surface of the partial surfaces of the first area overlaid with the facet faces and of the areas of surface of the first area overlaid with the background structure is less than 70%, when the multi-layer body is viewed perpendicular to the base plane.

30. A multi-layer body according to claim 1, wherein the centroids of adjacent facet faces is spaced apart from each other by between 2 μm and 300 μm.

31. A multi-layer body according to claim 1, wherein the minimum distance between a point on the outside edge of each of the facet faces and a point on the outside edge of the respectively adjacent facet face is less than 300 μm.

32. A multi-layer body according to claim 1, wherein the reflective second layer is provided in the first area in each case in the area of the facet faces and is not provided in a first partial section not overlaid with the facet faces.

33. A multi-layer body according to claim 32, wherein the reflective second layer is provided in the first area in a second partial section not overlaid with the facet faces.

34. A multi-layer body according to claim 33, wherein the first and/or second partial section is formed in a pattern, and the first partial section forms a pattern area and the second partial section forms a background area for the first partial section or vice versa, and wherein, when viewed with light passing through, the multi-layer body provides an item of information which is determined by the form of the first and second partial section and is visible for the human observer.

35. A multi-layer body according to claim 32, wherein the first partial section forms a background area for the partial sections of the first area overlaid with the facet faces.

* * * * *